US010691939B2

(12) United States Patent
Xue et al.

(10) Patent No.: US 10,691,939 B2
(45) Date of Patent: Jun. 23, 2020

(54) SYSTEMS AND METHODS FOR PERFORMING IRIS IDENTIFICATION AND VERIFICATION USING MOBILE DEVICES

(71) Applicant: Veridium IP Limited, London (GB)

(72) Inventors: Yiqun Xue, Quincy, MA (US); Jonathan Francis Mather, Oxford (GB)

(73) Assignee: VERIDIUM IP LIMITED, London (GB)

( * ) Notice: Subject to any disclaimer, the term of this patent is extended or adjusted under 35 U.S.C. 154(b) by 131 days.

(21) Appl. No.: 15/679,635

(22) Filed: Aug. 17, 2017

(65) Prior Publication Data

US 2017/0344793 A1 Nov. 30, 2017

Related U.S. Application Data

(62) Division of application No. 14/887,966, filed on Oct. 20, 2015, now Pat. No. 9,767,358.

(Continued)

(51) Int. Cl.
*G06K 9/00* (2006.01)
*G06K 9/46* (2006.01)
(Continued)

(52) U.S. Cl.
CPC ......... *G06K 9/0061* (2013.01); *G01B 11/22* (2013.01); *G06K 9/00597* (2013.01);
(Continued)

(58) Field of Classification Search
CPC ......... G06K 9/00597; G06K 9/0061; G06K 9/00617; G06K 9/00906; G06K 9/4604;
(Continued)

(56) References Cited

U.S. PATENT DOCUMENTS 5,572,596 A * 11/1996 Wildes .............. G06K 9/00
382/117
5,963,675 A * 10/1999 van der Wal ......... G06T 1/20
375/E7.093

(Continued)

OTHER PUBLICATIONS

Wildes, Richard P. ("Iris Recognition: An Emerging Biometric Technology," Proceedings of the IEEE, vol. 85, No. 9, Sep. 1997)—[Applies Hough transform to detect iris boundary contours (Section II.B. Iris Localization, especially p. 1355].*

(Continued)

*Primary Examiner* — Yubin Hung
(74) *Attorney, Agent, or Firm* — Leason Ellis LLP

(57) ABSTRACT

Technologies are presented herein in support of a system and method for performing iris identification and verification using mobile devices. Embodiments of the present invention concern a method for authenticating a user with a mobile device that includes steps for capturing imagery of a user's face, analyzing the imagery to identify the portion of the image depicting the user's eyes and segmenting the eye image to isolate the iris image data and encoding the iris image data in iris template. The present disclosure further describes authenticating the user based on the encoded iris template and additional techniques for preventing erroneous authentication caused by spoofing. In some examples, the anti-spoofing techniques may include capturing one or more images of a user's eyes and analyzing the captured images for indications of liveness based on reflection characteristics depicted in the imagery.

12 Claims, 28 Drawing Sheets

Related U.S. Application Data

(60) Provisional application No. 62/066,957, filed on Oct. 22, 2014, provisional application No. 62/129,277, filed on Mar. 6, 2015.

(51) Int. Cl.
| | |
|---|---|
| *G06K 9/52* | (2006.01) |
| *H04N 5/232* | (2006.01) |
| *H04N 5/33* | (2006.01) |
| *G06T 7/11* | (2017.01) |
| *G01B 11/22* | (2006.01) |

(52) U.S. Cl.
CPC ..... *G06K 9/00604* (2013.01); *G06K 9/00617* (2013.01); *G06K 9/00906* (2013.01); *G06K 9/4604* (2013.01); *G06K 9/4661* (2013.01); *G06K 9/52* (2013.01); *G06T 7/11* (2017.01); *H04N 5/23219* (2013.01); *H04N 5/33* (2013.01); *H04N 5/332* (2013.01); *G06K 2009/4666* (2013.01); *G06T 2207/30041* (2013.01)

(58) Field of Classification Search
CPC .. G06K 9/464; G06T 3/20; G06T 3/40; G06T 2207/20112; G06T 2207/20224; G06T 2207/01
See application file for complete search history.

(56) References Cited

U.S. PATENT DOCUMENTS

| | | | | |
|---|---|---|---|---|
| 6,095,989 | A * | 8/2000 | Hay | A61B 3/0025 600/558 |
| 9,230,158 | B1* | 1/2016 | Ramaswamy | G06K 9/00281 |
| 9,327,406 | B1* | 5/2016 | Hinterstoisser | B25J 9/1697 |
| 2003/0018475 | A1* | 1/2003 | Basu | G06K 9/00228 704/270 |
| 2004/0141067 | A1* | 7/2004 | Nakayama | H04N 1/0411 348/222.1 |
| 2004/0146187 | A1* | 7/2004 | Jeng | G06K 9/00281 382/117 |
| 2005/0105778 | A1* | 5/2005 | Sung | G06K 9/00255 382/115 |
| 2006/0104487 | A1* | 5/2006 | Porter | G06K 9/00228 382/118 |
| 2007/0081094 | A1* | 4/2007 | Ciudad | H04N 5/2354 348/371 |
| 2007/0110285 | A1* | 5/2007 | Hanna | G06K 9/00604 382/117 |
| 2007/0160267 | A1* | 7/2007 | Jones | G06K 9/0061 382/117 |
| 2008/0278687 | A1* | 11/2008 | Somani | A61B 3/0075 351/208 |
| 2009/0316988 | A1* | 12/2009 | Xu | G06K 9/6256 382/173 |
| 2010/0299530 | A1* | 11/2010 | Bell | G06F 21/32 713/186 |
| 2011/0075893 | A1* | 3/2011 | Connel, II | G06K 9/00617 382/117 |
| 2013/0069924 | A1* | 3/2013 | Robinson | G09G 3/20 345/207 |
| 2013/0169530 | A1* | 7/2013 | Bhaskar | G06F 3/012 345/157 |
| 2013/0176453 | A1* | 7/2013 | Mate | H04N 5/2355 348/222.1 |
| 2013/0219480 | A1* | 8/2013 | Bud | G06F 21/32 726/7 |
| 2013/0223681 | A1* | 8/2013 | Lee | G06K 9/00597 382/103 |
| 2014/0099005 | A1* | 4/2014 | Mogi | G06K 9/00288 382/118 |
| 2014/0111550 | A1* | 4/2014 | Abraham | G06F 1/1694 345/660 |
| 2014/0337930 | A1* | 11/2014 | Hoyos | H04L 63/10 726/4 |
| 2015/0085096 | A1* | 3/2015 | Smits | G02B 23/02 348/78 |
| 2015/0193667 | A1* | 7/2015 | Acharya | G06K 9/18 382/165 |
| 2015/0215532 | A1* | 7/2015 | Jafarzadeh | H04N 5/23238 348/36 |
| 2015/0373285 | A1* | 12/2015 | Morris | G01N 21/274 250/252.1 |
| 2016/0019421 | A1* | 1/2016 | Feng | G06K 9/00604 382/117 |

OTHER PUBLICATIONS

Tian et al. ("Fast algorithm and application of Hough transform in iris segmentation," IEEE International Conference on Machine Learning and Cybernetics, Aug. 26-29, 2004)].*

Proenca et al. ("Ubiris: A noisy iris image database," Proceedings of the 13th International Conference on Image Analysis and Processing, Sep. 6, 2005).*

Wildes, Richard P. ("Iris Recognition: An Emerging Biometric Technology," Proceedings of the IEEE, vol. 85, No. 9, Sep. 1997)—[Applies Hough transform to detect iris boundary contours (Section II.B. Iris Localization, especially p. 1355] (Year: 1997).*

Tian et al. ("Fast algorithm and application of Hough transform in iris segmentation," IEEE International Conference on Machine Learning and Cybernetics, Aug. 26-29, 2004)] (Year: 2004).*

Proenca et al. ("Ubiris: A noisy iris image database," Proceedings of the 13th International Conference on Image Analysis and Processing, Sep. 6, 2005) (Year: 2005).*

Komogortsev et al. ("Liveness detection via oculomotor plant characteristics: Attack of mechanical replicas," IEEE International Conference on Biometrics, Jun. 4-7, 2013) (Year: 2013).*

Rigas et al. ("Gaze estimation as a framework for iris liveness detection," IEEE International Joint Conference on Biometrics, Sep. 29-Oct. 2, 2014) (Year: 2014).*

Pacut et al. ("Aliveness Detection for IRIS Biometrics," International Carnahan Conference on Security Technology, Oct. 6-19, 2006) (Year: 2006).*

Akhtar et al. ("Liveness detection for biometric authentication in mobile applications," International Carnahan Conference on Security Technology, Oct. 13-16, 2014) (Year: 2014).*

* cited by examiner

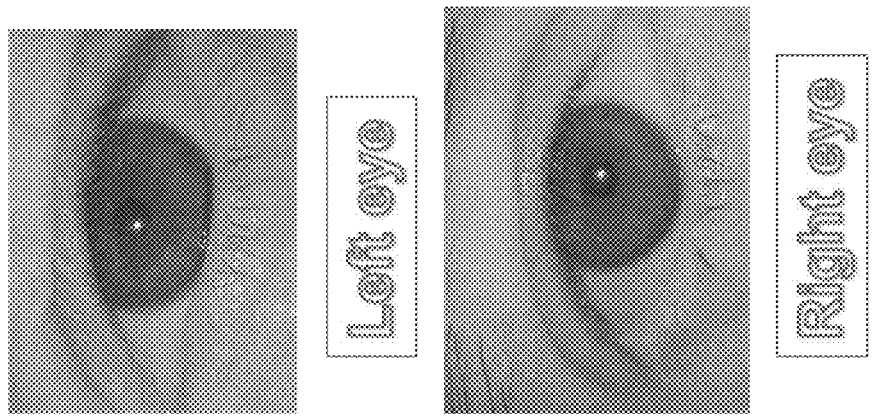
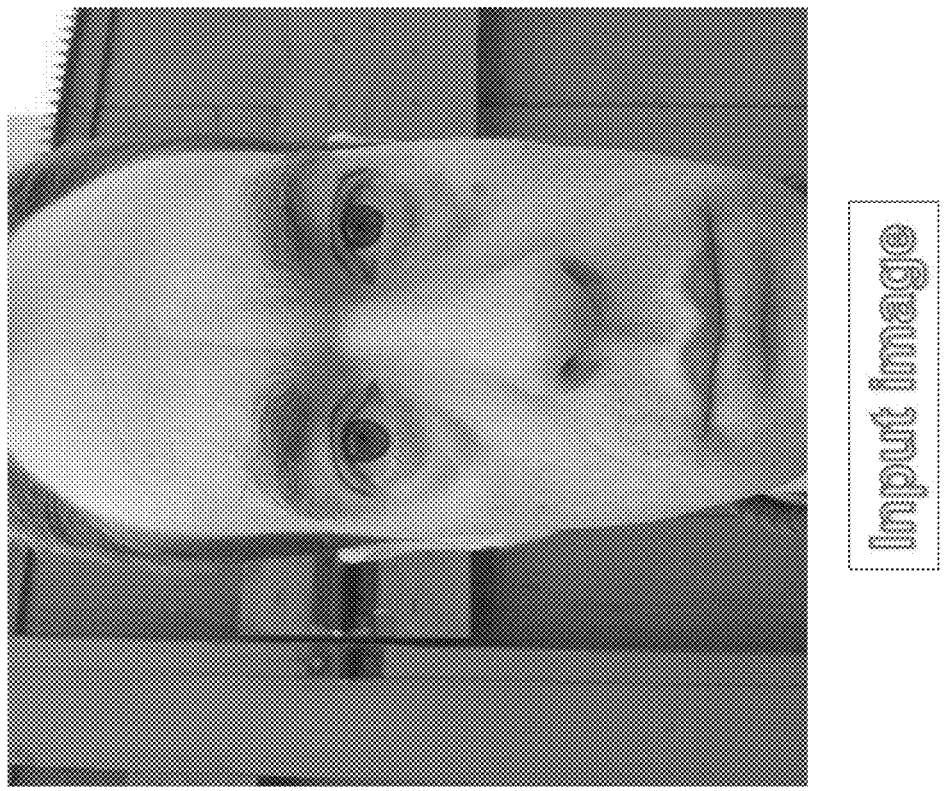
FIG. 8B

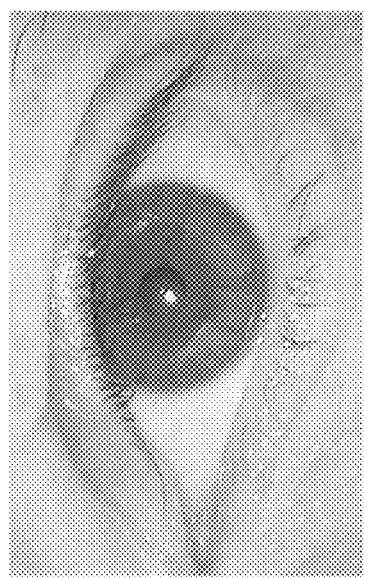
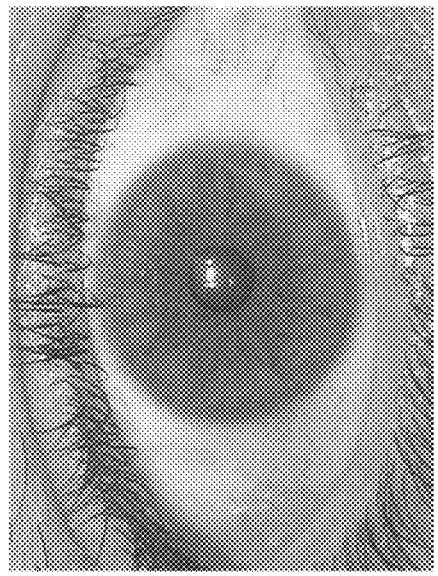
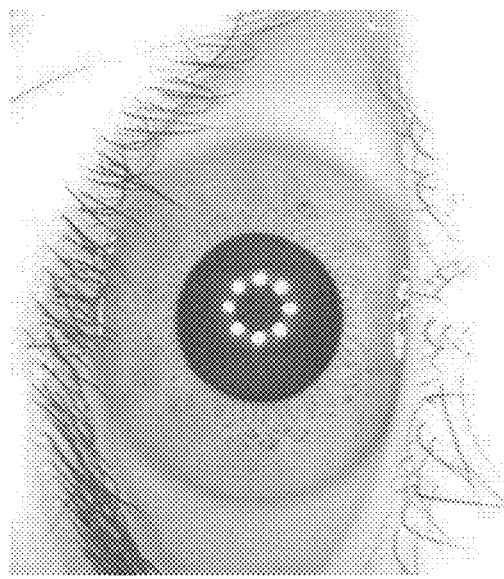
FIG. 8C

Removing noise from visible light iris images

Iris patterns seem present in visible images, the key problem is that there is more noise because the patterns are fainter.

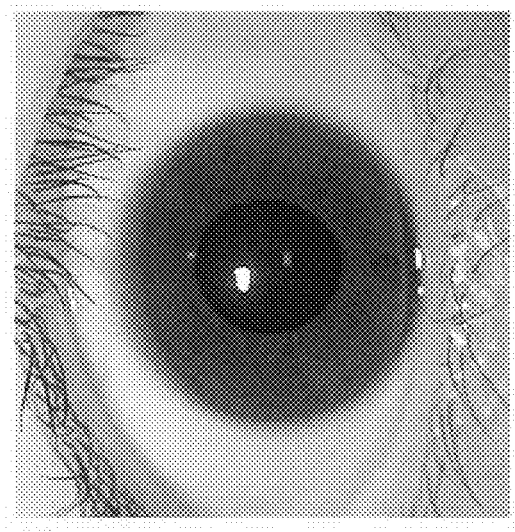

Dark eye (Red channel of visible light image)

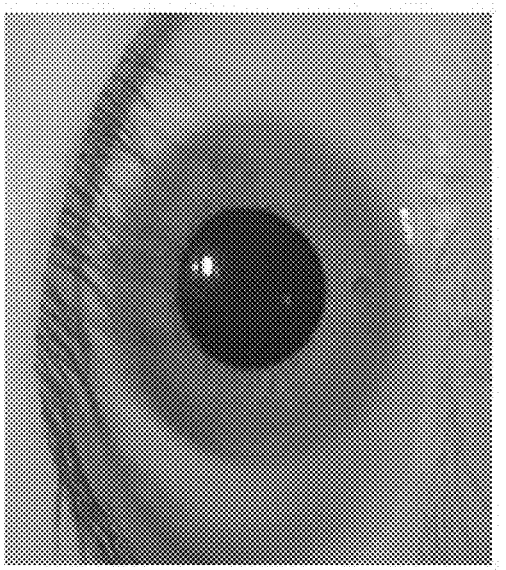

Dark eye (NIR image)

The 'photonics' software can be used to do a basic super-resolution to decrease the noise, i.e. by combine several frames over a period of say 1 second the noise can be removed as below:

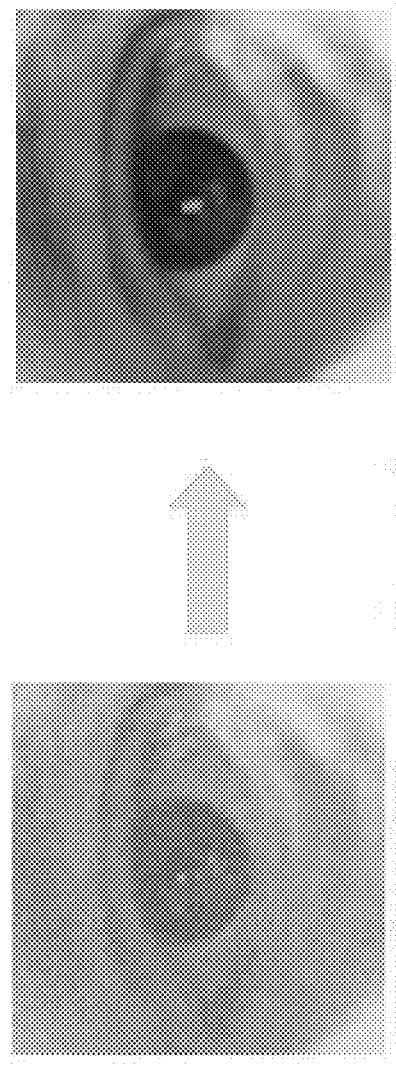

Taken in low light

Several combined low light frames

Fig. 9C

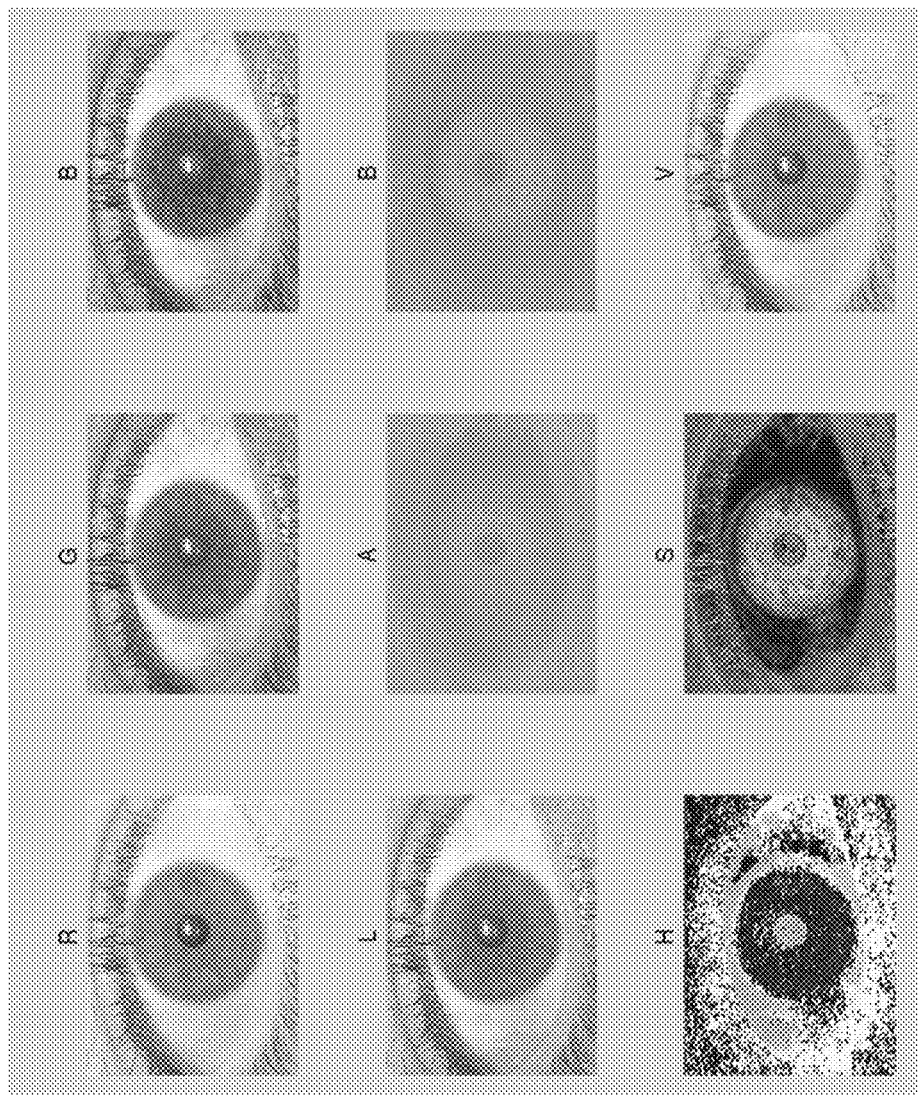
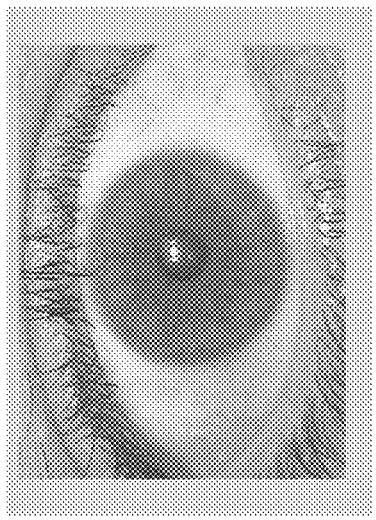
FIG. 12O
Original

SYSTEMS AND METHODS FOR PERFORMING IRIS IDENTIFICATION AND VERIFICATION USING MOBILE DEVICES

CROSS-REFERENCE TO RELATED APPLICATIONS

The present application is a divisional application of U.S. patent application Ser. No. 14/887,966 filed on Oct. 20, 2015, now U.S. Pat. No. 9,767,358 issued on Sep. 19, 2017, which claims benefit of U.S. Patent Application No. 62/066,957, entitled "SYSTEMS AND METHODS FOR PERFORMING IRIS IDENTIFICATION AND VERIFICATION USING MOBILE DEVICES UTILIZING VISIBLE SPECTRUM LIGHTING" filed on Oct. 22, 2014; U.S. Patent Application Ser. No. 62/129,277, entitled "SYSTEMS AND METHODS FOR PERFORMING IRIS IDENTIFICATION AND VERIFICATION USING MOBILE DEVICES" filed Mar. 6, 2015; the contents of each of which is hereby incorporated by reference as if set forth expressly in its respective entirety herein.

TECHNICAL FIELD OF THE INVENTION

The present invention relates to systems and methods for biometrics based user authentication, in particular, systems and methods for capturing and characterizing biometric features of eyes using a mobile device for the purposes of user recognition and authorization.

BACKGROUND

As a biometric is a biological characteristic of an individual (such as a fingerprint, the geometry of a hand, Retina pattern, iris shape, texture, etc.), biometric techniques can be used as an identity verification factor since biometrics are usually more difficult to obtain than other non-biometric credentials. Biometrics can be used for identification and/or authentication (also referred to as identity assertion and/or verification).

Biometric identity assertion can require a certain level of security as dictated by the application. For example, authentication in connection with a financial transaction or gaining access to a secure location requires higher security levels. As a result, preferably, the accuracy of the biometric representation of a user is sufficient to ensure that the user is accurately authenticated and security is maintained. However, to the extent iris, face, finger, and voice identity assertion systems exist and provide the requisite level of accuracy, such systems require dedicated devices and applications and are not easily implemented on conventional smartphones, which have limited camera resolution and light emitting capabilities.

The challenges surrounding traditional biometric feature capture techniques, which generally require high resolution imagery, multi-spectral lighting and significant computing power to execute the existing image analysis algorithms to achieve the requisite accuracy dictated by security have made biometric authentication not widely available or accessible to the masses. Moreover, traditional biometric authentication techniques requiring dedicated devices used in a specific way (e.g., require a cooperative subject, have a narrow field of view, biometric must be obtained in a specific way) detracts from user convenience and wide-scale implementation.

Additional challenges surrounding traditional biometric authentication techniques involve unauthorized access by users who leverage vulnerabilities of facial recognition programs to cause erroneous authentication. For example, an unauthorized user may attempt to unlock a computing device using "spoofing" techniques. To cause erroneous authentication by spoofing, an unauthorized user may present a facial image of an authorized user for capture by the computing device. For example, an unauthorized user may present to the device a printed picture of the authorized user's face or obtain a video or digital image of an authorized user on a second computing device (e.g., by pulling up an authorized user's profile picture from a social networking website). Thus, an unauthorized user may attempt to use spoofing methods to gain access to functionalities of the computing device or to authenticate transactions fraudulently.

Accordingly, there is a need for systems and methods with which a user's identity can be verified conveniently, seamlessly, and with a sufficient degree of accuracy, from biometric information captured from the user using smartphone devices.

SUMMARY OF THE INVENTION

Technologies are presented herein in support of a system and method for performing iris identification and verification using mobile devices.

According to a first aspect, a method for performing iris recognition of a user based on imagery of the user captured using a mobile computing device is provided. The method is executed using a mobile computing device having a camera, a light emitter, a non-transitory storage medium, instructions stored on the storage medium, and a processor configured by executing the instructions. The method includes the step of capturing, by the mobile device camera, a first image depicting a facial region of a user. The method also includes the step of processing the first image among the images using an eye finding algorithm to identify an eye of the user depicted in the first image. The method also includes illuminating, using a light source, the user and capturing, using the camera during the illuminating step, a second image of the subject. The method also includes, analyzing one or more of the first and second images to identify a location of the eye depicted in the one or more of the first and second images and isolating, based on the identified location, an eye image within the second image, wherein the eye image is a portion of the second image that depicts the eye. In addition the method includes segmenting, with the processor, an iris image from the eye image, wherein the iris image is a portion of the eye image that includes iris image data corresponding to an iris. In addition the method includes encoding, with the processor from the segmented iris image, the iris image data as an iris template and authenticating the user by matching the encoded iris template to a previously stored encoded iris template for a match and providing a result of the authentication According to another aspect, a method for authenticating a user based on imagery of the user captured using a mobile computing device is provided. The method is implemented using a mobile computing device having a camera, a light emitter, a non-transitory storage medium, instructions stored on the storage medium, and a processor configured by executing the instructions. The method includes the step of capturing, by the mobile device camera, a plurality of images depicting at least one facial region of the user. At least a first image is captured by the camera while the light emitter is activated and illuminating the user, and at least a second image is captured while the light emitter is deactivated and is not illuminating the user. The method also includes detecting, by the processor in at least the first and the second images from among the plurality of images, an eye of the user depicted in the respective images and aligning at least the first image and the second image. The method also includes the step of subtracting, by the processor, at least a portion of the first image from a corresponding portion of the second image and detecting, by the processor based on a result of the image subtraction performed, a reflection characteristic. In addition the method includes determining, by the processor, that the imagery depicts a live user by comparing the detected reflection characteristic to one or more prescribed reflection characteristics.

These and other aspects, features, and advantages can be appreciated from the accompanying description of certain embodiments of the invention and the accompanying drawing figures and claims.

BRIEF DESCRIPTION OF THE DRAWINGS

FIG. 8B illustrates imagery of a user's face in accordance with at least one embodiment disclosed herein;

FIG. 8C illustrates imagery of a user's eyes in accordance with at least one embodiment disclosed herein;

FIG. 9C illustrates imagery of a user's eyes in accordance with at least one embodiment disclosed herein.

FIG. 12O illustrates an exemplary eye image, corresponding color channel specific images and corresponding processed images in accordance with at least one embodiment disclosed herein.

DETAILED DESCRIPTION OF CERTAIN EMBODIMENTS OF THE INVENTION

Figure 1:
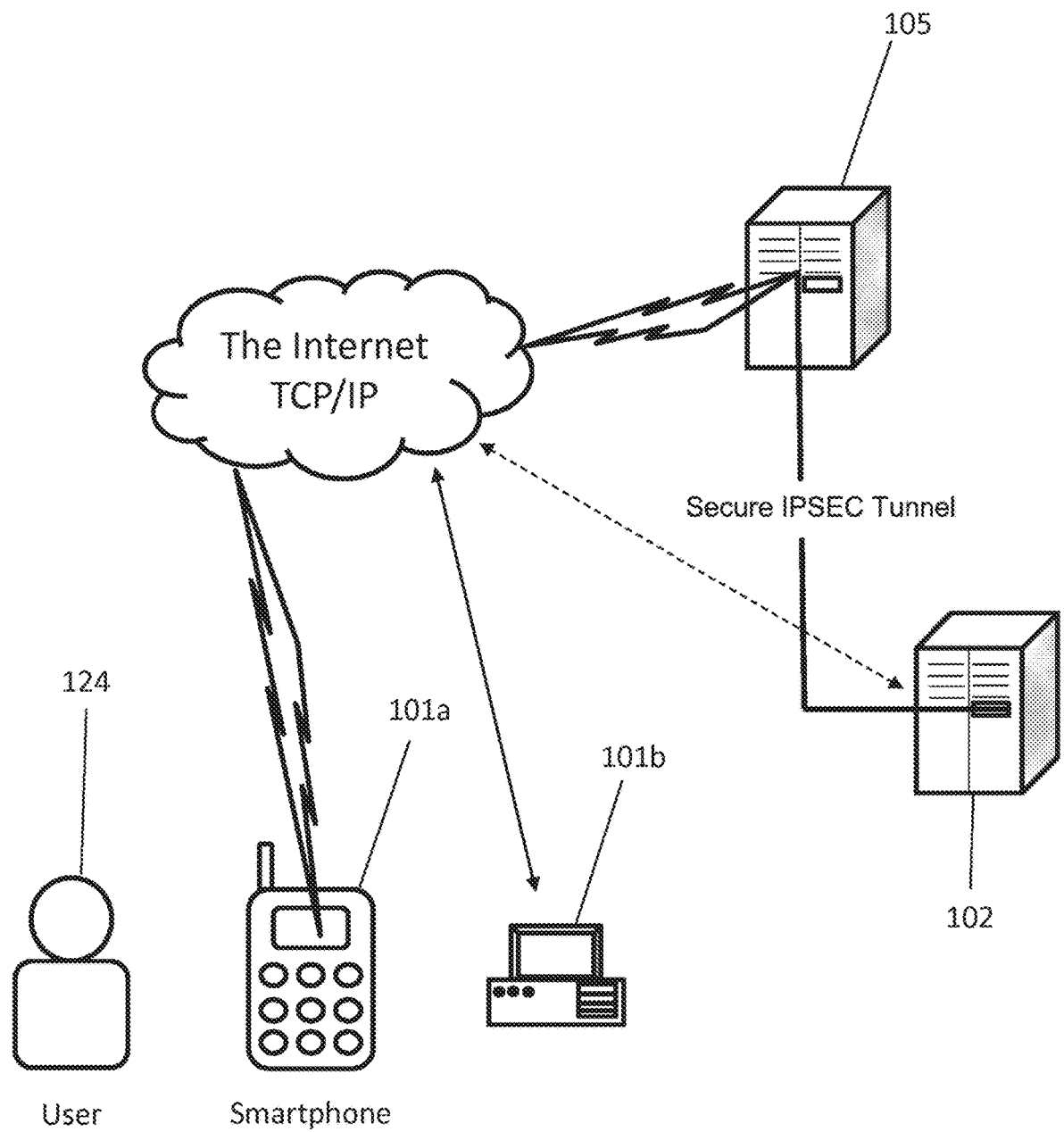
FIG. 1 is a high-level diagram of a computer system for authenticating a user according to the user's biometric features in accordance with at least one embodiment disclosed herein.

By way of example only and for the purpose of overview and introduction, embodiments of the present invention are described below which concern a system and method for capturing a user's biometric features and generating an identifier characterizing the user's biometric features using a mobile device such as a smartphone. The biometric identifier is preferably generated for the purposes of authenticating/identifying the user according to the captured biometrics and determining the user's liveness. The present disclosure also describes additional techniques for preventing erroneous authentication caused by spoofing. In some examples, the anti-spoofing techniques may include capturing one or more images of a user's face or regions therein, including the eyes (e.g., iris, cornea etc.), the periocular region and surrounding area, and analyzing the captured images for indications of liveness.

In some implementations, the system includes a cloud based system server platform that communicates with fixed PC's, servers, and devices such as laptops, tablets and smartphones operated by users. As the user attempts to access a networked environment that is access controlled, for example, a website which requires a secure login, the user is prompted to authenticate using the user's preregistered mobile device. Authentication can include verifying the user's identity and/or verifying that the user is alive (e.g., determining liveness) by capturing biometric information in the form of at least images of the user's eyes and/or periocular region and/or face or any combination of the foregoing (referred to as the Vitruvian region), extracting unique features and encoding the features as a biometric identifier that is indicative of the user's biometric features and/or liveness using the mobile device. Accordingly, the users identity and/or liveness can be verified by the mobile device and/or the system server or a combination of the foregoing by analyzing the biometric identifier and/or comparing the biometric identifier to a biometric identifier generated during the user's initial enrollment with the system.

According to an aspect of the subject application, capturing images for the purpose of identifying a user's biometric features can be performed using conventional digital cameras that are found on smart phones and other such mobile devices. In addition, identifying users based on biometric features can be performed according to positive eye authentication techniques, preferably, applying algorithms analyzing the iris and/or periocular regions and/or face, as further described herein, without requiring infra-red images or IR emitters which are not widely integrated in smartphones.

The present disclosure also describes techniques for capturing and extracting biometric features from imagery of the user's face and portions thereof (e.g., iris feature extraction) and also describes preventing erroneous authentication caused by spoofing. In some examples, the anti-spoofing techniques may include capturing one or multiple facial images of a user, and analyzing the facial images for indications of liveness. For example, the anti-spoofing programs may identify one or both eyes of the facial image as landmarks. The anti-spoofing programs may then detect and analyze transitions between the images as relates to one or both eyes. Using any detected transitions, the anti-spoofing programs may detect facial gestures or other characteristics of the imagery indicating liveness. Based on the analysis and the detection of satisfactory liveness, the liveness determination programs may prevent or grant access to functionalities controlled by the computing device.

An exemplary system for authenticating a user and/or determining the user's liveness according to imagery of the user's biometric features 100 is shown as a block diagram in FIG. 1. In one arrangement, the system consists of a system server 105 and user devices including a mobile device 101a and a user computing device 101b. The system 100 can also include one or more remote computing devices 102.

The system server 105 can be practically any computing device and/or data processing apparatus capable of communicating with the user devices and remote computing devices and receiving, transmitting and storing electronic information and processing requests as further described herein. Similarly, the remote computing device 102 can be practically any computing device and/or data processing apparatus capable of communicating with the system server and/or the user devices and receiving, transmitting and storing electronic information and processing requests as further described herein. It should also be understood that the system server and/or remote computing device can be a number of networked or cloud based computing devices.

In some implementations, computing device 102 can be associated with an enterprise organization, for example, a bank or a website, that maintain user accounts ("enterprise accounts") and provide services to enterprise account holders and require authentication of the user prior to providing the user access to such systems and services.

The user devices, mobile device 101a and user computing device 101b, can be configured to communicate with one another, the system server 105 and/or remote computing device 102, transmitting electronic information thereto and receiving electronic information therefrom as further described herein. The user devices can also be configured to receive user inputs as well as capture and process biometric information, for example, digital images and voice recordings of a user 124.

The mobile device 101a can be any mobile computing devices and/or data processing apparatus capable of embodying the systems and/or methods described herein, including but not limited to a personal computer, tablet computer, personal digital assistant, mobile electronic device, cellular telephone or smart phone device and the like. The computing device 101b is intended to represent various forms of computing devices that a user can interact with, such as workstations, a personal computer, laptop computer, dedicated point-of-sale systems, ATM terminals, access control devices or other appropriate digital computers.

As further described herein, the system 100, facilitates the authentication of a user 124 according to a user's biometric features using a mobile device 101a. In some implementations, identification and/or authentication according to a user's biometric features utilizes a user's biometric information in a two stage process. The first stage is referred to as enrollment. In the enrollment stage samples (e.g., images) of appropriate biometric(s) is/are collected from an individual. These samples of biometrics are analyzed and processed to extract features (or characteristics) present in each sample. The set of features present in the imaged biometric of an individual constitutes an identifier for the person and are useable to authenticate the user and, in some implementations, determine whether the user is a live subject. These identifiers are then stored to complete the enrolment stage. In the second stage the same biometric of the individual is measured. Features from this biometric are extracted similar to the enrollment phase to obtain a current biometric identifier. If the goal is determining liveness, the features or characteristics can be analyzed to determine if they are representative of a live subject. As further described herein, other features and characteristics of the captured imagery of the biometrics can be analyzed to determine liveness. If the goal is identification, then this identifier is searched for in the database of identifiers generated in the first phase. If a match occurs, the identification of the individual is revealed, otherwise identification fails. If the goal is authentication, then the identifier generated in the second stage is compared with the identifier generated in the first stage for the particular person. If a match occurs, authentication is successful, otherwise authentication fails.

It should be noted that while FIG. 1 depicts the system for authenticating a user 100 with respect to a mobile device 101a and a user computing device 101b and a remote computing device 102, it should be understood that any number of such devices can interact with the system in the manner described herein. It should also be noted that while FIG. 1 depicts a system for authenticating a user 100 with respect to the user 124, it should be understood that any number of users can interact with the system in the manner described herein.

It should be further understood that while the various computing devices and machines referenced herein, including but not limited to mobile device 101a and system server 105 and remote computing device 102 are referred to herein as individual/single devices and/or machines, in certain implementations the referenced devices and machines, and their associated and/or accompanying operations, features, and/or functionalities can be combined or arranged or otherwise employed across any number of such devices and/or machines, such as over a network connection or wired connection, as is known to those of skill in the art.

It should also be understood that the exemplary systems and methods described herein in the context of the mobile device 101a (also referred to as a smartphone) are not specifically limited to the mobile device and can be implemented using other enabled computing devices (e.g., the user computing device 102b).

Figure 2A:
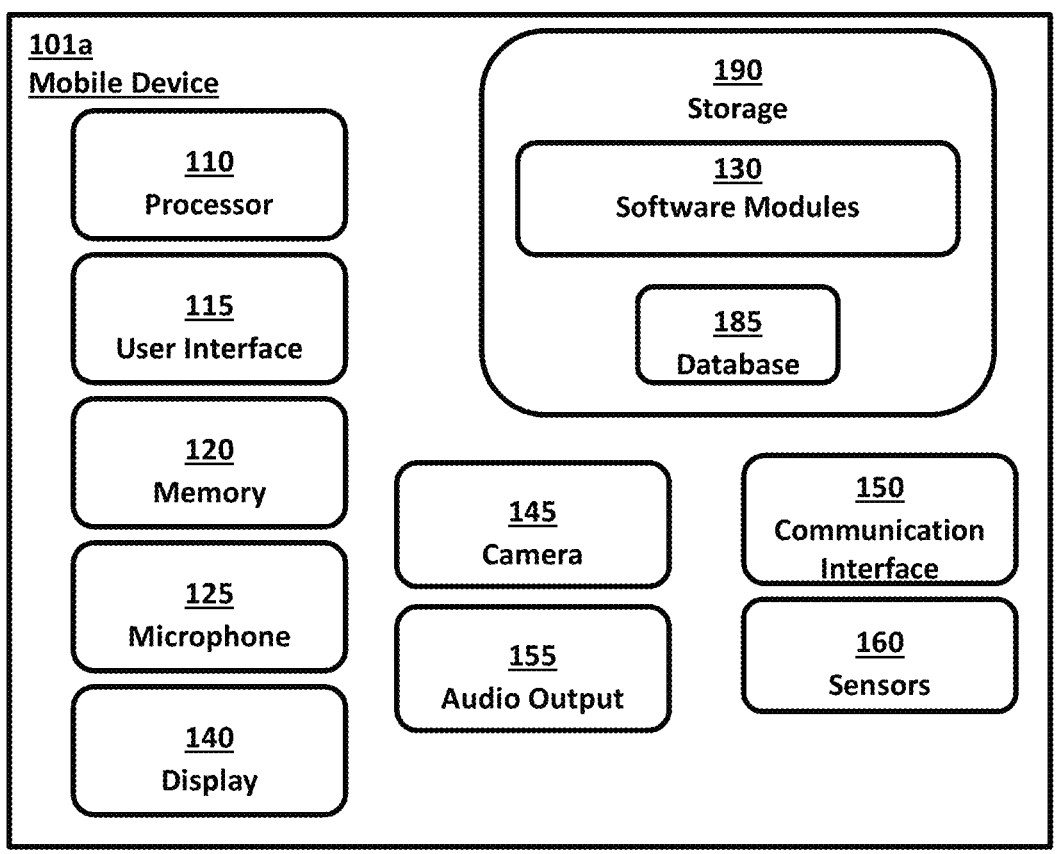
FIG. 2A is a block diagram of a computer system for authenticating a user according to the user's biometric features in accordance with at least one embodiment disclosed herein.

In reference to FIG. 2A, mobile device 101a of the system 100, includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the systems and methods as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2B:
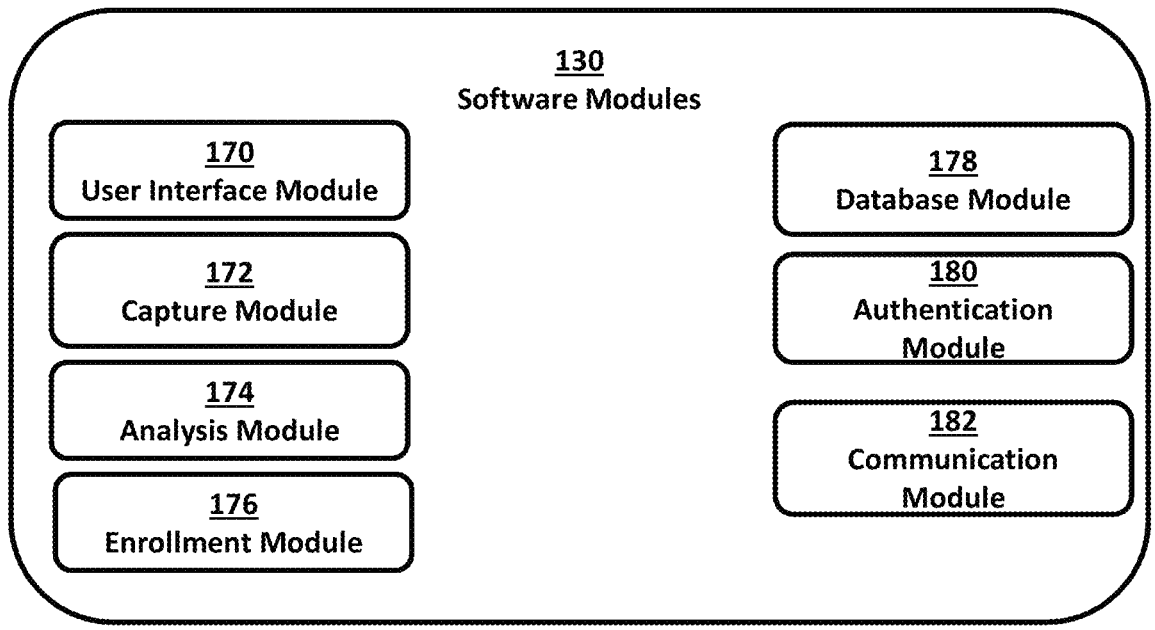
FIG. 2B is a block diagram of software modules for authenticating a user according to the user's biometric features in accordance with at least one embodiment disclosed herein.

One or more software modules 130 are encoded in the storage 190 and/or in the memory 120. The software modules 130 can comprise one or more software programs or applications having computer program code or a set of instructions (also referred to as the "mobile authentication client application") executed in the processor 110. As depicted in FIG. 2B, preferably, included among the software modules 130 is a user interface module 170, a biometric capture module 172, an analysis module 174, an enrollment module 176, a database module 178, an authentication module 180 and a communication module 182 that are executed by processor 110. Such computer program code or instructions configure the processor 110 to carry out operations of the systems and methods disclosed herein and can be written in any combination of one or more programming languages.

The program code can execute entirely on mobile device 101, as a stand-alone software package, partly on mobile device, partly on system server 105, or entirely on system server or another remote computer/device. In the latter scenario, the remote computer can be connected to mobile device 101 through any type of network, including a local area network (LAN) or a wide area network (WAN), mobile communications network, cellular network, or the connection can be made to an external computer (for example, through the Internet using an Internet Service Provider).

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150 for use within the system 100. In addition, it should be noted that other information and/or data relevant to the operation of the present systems and methods (such as database 185) can also be stored on storage. Preferably, such information is stored on an encrypted data-store that is specifically allocated so as to securely store information collected or generated by the processor executing the secure authentication application. Preferably, encryption measures are used to store the information locally on the mobile device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the mobile device 101a and/or system server 105 can be encrypted using a user's biometric information, liveness information, or mobile device information as an encryption key. In some implementations, a combination of the foregoing can be used to create a complex unique key for the user that can be encrypted on the mobile device using Elliptic Curve Cryptography, preferably at least 384 bits in length. In addition, that key can be used to secure the user data stored on the mobile device and/or the system server.

Also preferably stored on storage 190 is database 185. As will be described in greater detail below, the database contains and/or maintains various data items and elements that are utilized throughout the various operations of the system and method for authenticating a user 100. The information stored in database can include but is not limited to a user profile, as will be described in greater detail herein. It should be noted that although database is depicted as being configured locally to mobile device 101a, in certain implementations the database and/or various of the data elements stored therein can, in addition or alternatively, be located remotely (such as on a remote device 102 or system server 105—not shown) and connected to mobile device through a network in a manner known to those of ordinary skill in the art.

A user interface 115 is also operatively connected to the processor. The interface can be one or more input or output device(s) such as switch(es), button(s), key(s), a touchscreen, microphone, etc. as would be understood in the art of electronic computing devices. User Interface serves to facilitate the capture of commands from the user such as an on-off commands or user information and settings related to operation of the system for authenticating a user 100. For example, interface serves to facilitate the capture of certain information from the mobile device 101 such as personal user information for enrolling with the system so as to create a user profile.

The computing device 101a can also include a display 140 which is also operatively connected to processor the processor 110. The display includes a screen or any other such presentation device which enables the system to instruct or otherwise provide feedback to the user regarding the operation of the system for authenticating a user 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

Mobile device 101a also includes a camera 145 capable of capturing digital images. The camera can be one or more imaging devices configured to capture images of at least a portion of the user's body including the user's eyes and/or face while utilizing the mobile device 101a. The camera serves to facilitate the capture of images of the user for the purpose of image analysis by the mobile device processor 110 executing the secure authentication client application which includes identifying biometric features for (biometrically) authenticating the user from the images and determining the user's liveness. The mobile device 101a and/or the camera 145 can also include one or more light or signal emitters (e.g., LEDs, not shown) for example, a visible light emitter and/or infra-red light emitter and the like. The camera can be integrated into the mobile device, such as a front-facing camera or rear facing camera that incorporates a sensor, for example and without limitation a CCD or CMOS sensor. As would be understood by those in the art, camera 145 can also include additional hardware such as lenses, light meters (e.g., lux meters) and other conventional hardware and software features that are useable to adjust image capture settings such as zoom, focus, aperture, exposure, shutter speed and the like. Alternatively, the camera can be external to the mobile device 101a. The possible variations of the camera and light emitters would be understood by those skilled in the art. In addition, the mobile device can also include one or more microphones 104 for capturing audio recordings as would be understood by those skilled in the art.

Audio output 155 is also operatively connected to the processor 110. Audio output can be any type of speaker system that is configured to play electronic audio files as would be understood by those skilled in the art. Audio output can be integrated into the mobile device 101 or external to the mobile device 101.

Various hardware devices/sensors 160 are also operatively connected to the processor. The sensors 160 can include: an on-board clock to track time of day, etc.; a GPS enabled device to determine a location of the mobile device; an accelerometer to track the orientation and acceleration of the mobile device; Gravity magnetometer to detect the Earth's magnetic field to determine the 3-dimensional orientation of the mobile device; proximity sensors to detect a distance between the mobile device and other objects; RF radiation sensors to detect the RF radiation levels; and other such devices as would be understood by those skilled in the art.

Communication interface 150 is also operatively connected to the processor 110 and can be any interface that enables communication between the mobile device 101a and external devices, machines and/or elements including system server 105. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

At various points during the operation of the system for authenticating a user 100, the mobile device 101a can communicate with one or more computing devices, such as system server 105, user computing device 101b and/or remote computing device 102. Such computing devices transmit and/or receive data to/from mobile device 101a, thereby preferably initiating maintaining, and/or enhancing the operation of the system 100, as will be described in greater detail below.

Figure 2C:
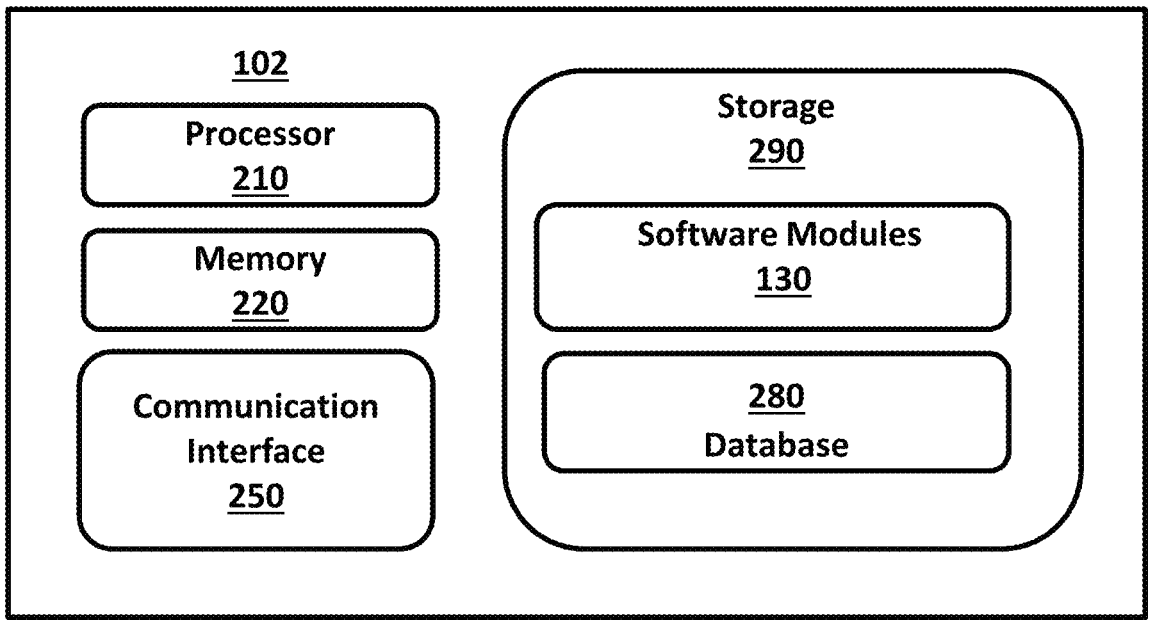
FIG. 2C is a block diagram of a computer system for authenticating a user according to the user's biometric features in accordance with at least one embodiment disclosed herein.

FIG. 2C is a block diagram illustrating an exemplary configuration of system server 105. System server 105 can include a processor 210 which is operatively connected to various hardware and software components that serve to enable operation of the system for authentication of a user 100. The processor 210 serves to execute instructions to perform various operations relating to user authentication and transaction processing as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more of the software modules 130 are encoded in the storage 290 and/or in the memory 220. One or more of the software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, mobile device 101a and/or user computing device 101b, or entirely on such remote computing devices. As depicted in FIG. 2B, preferably, included among the software modules 130 are an analysis module 274, an enrollment module 276, an authentication module 280, a database module 278, and a communication module 282, that are executed by the system server's processor 210.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 205 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

The operation of the system for authenticating a user 100 and the various elements and components described above will be further appreciated with reference to the method for facilitating the capture of biometric information and authentication of a user based on biometric information as described below. The processes depicted herein are shown from the perspective of the mobile device 101a and/or the system server 105, however, it should be understood that the processes can be performed, in whole or in part, by the mobile device 101a, the system server 105 and/or other computing devices (e.g., remote computing device 102 and/or user computing device 101b) or any combination of the foregoing. It should be appreciated that more or fewer operations can be performed than shown in the figures and described herein. These operations can also be performed in a different order than those described herein. It should also be understood that one or more of the steps can be performed by the mobile device 101a and/or on other computing devices (e.g. computing device 101b, system server 105 and remote computing device 102).

General User Enrollment and User Authentication

Figure 4:
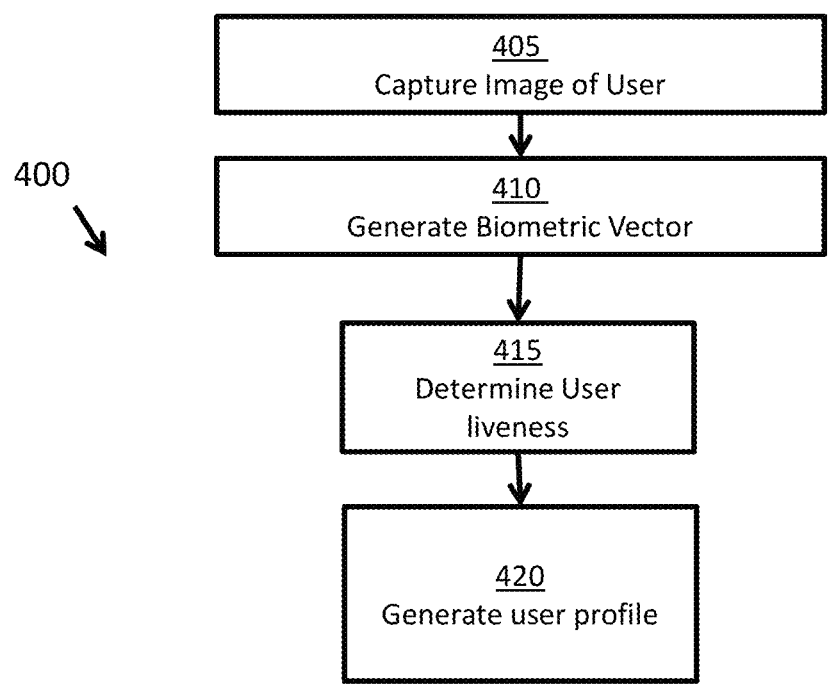
FIG. 4 is a flow diagram showing a routine for enrolling a user in accordance with at least one embodiment disclosed herein.

FIG. 4 is a flow diagram illustrating a routine 400 for enrolling the user 124 with the system 100. The enrollment process verifies the user's identity to ensure that the user is who they say they are and can also specify the manner in which the user 124 and the mobile device 101a are identified to the system server 105. Enrollment also includes capturing (e.g., reading) the user's biometrics features (step 405), generating one or more biometric identifiers characterizing those features (step 410). In addition the method can include determining the user's liveness (step 415). Lastly, enrollment can include creating a user profile by storing the generated biometric identifier(s) among other user identification information on persistent storage (step 420), for example, a data-store accessible by the mobile device processor 110 and/or the system server 105. Accordingly, it can be appreciated that many of the steps discussed in relation to FIG. 4 can be performed during subsequent user authentication sessions as discussed in relation to FIG. 5.

Figure 5:
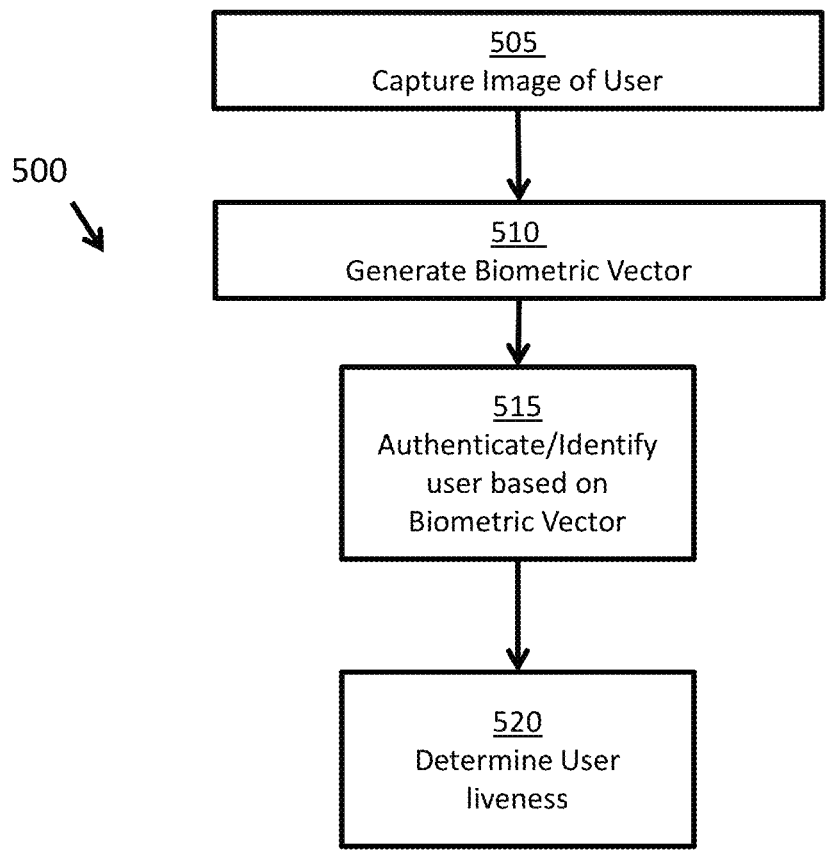
FIG. 5 is a flow diagram showing a routine for authenticating a user according to the user's biometric features in accordance with at least one embodiment disclosed herein.

Turning now to FIG. 5, which is a flow diagram that illustrates a routine 500 for authenticating a user 124 including determining the user's liveness and facilitating access to networked environments in accordance with at least one embodiment disclosed herein. Authentication includes capturing (e.g., reading) the user's biometrics features (step 505), generating one or more biometric identifiers characterizing those features (step 510). In addition the authentication method includes verifying authenticating the user's biometrics against a database of one or more enrolled user biometrics by matching biometric vectors (step 515). In addition the authentication method can include determining liveness (step 525). Lastly, authentication can include generating an authentication notification (step 530) or otherwise facilitating user authenticated access by the mobile device processor 110 and/or the system server 105. The exemplary systems and methods for capturing user biometrics (e.g., with digital imagery), analyzing the imagery to generate a biometric identifier, determining liveness and matching the user biometric to an enrolled biometric are further described herein. By way of non-limiting example, exemplary systems and methods for enrollment of a user and authenticating a user using a mobile device and based on biometric information are further described herein and in co-pending and commonly assigned U.S. patent application Ser. No. 14/276, 753, now U.S. Pat. No. 9,003,196 issued on Apr. 7, 2015, entitled "SYSTEM AND METHOD FOR AUTHORIZING ACCESS TO ACCESS CONTROLLED ENVIRONMENTS" filed May 13, 2014 which is hereby incorporated by reference as if set forth in its entirety herein.

Although many of the exemplary embodiments described herein concern systems and methods for authenticating a user and/or determining liveness based on imagery captured in the visual spectral bands or the near infra-red (NIR) or infra-red (IR) spectral bands, it can be appreciated that the disclosed embodiments are not so limited, as many of the systems and methods for image processing and biometric matching based on imagery captured in one particular spectral band can be similarly performed using imagery captured in other spectral bands.

By way of non-limiting example, exemplary systems and methods for capturing and encoding user biometrics, performing biometrics based user authentication and liveness detection are further described herein and in co-pending and commonly assigned U.S. patent application Ser. No. 14/201, 462, now U.S. Pat. No. 9,313,200 issued on Apr. 12, 2016, entitled "SYSTEMS AND METHODS FOR DETERMINING LIVENESS" filed Mar. 7, 2014; and U.S. patent application Ser. No. 14/201,499, now U.S. Pat. No. 9,294,475 issued on Mar. 22, 2016, entitled "SYSTEM AND METHOD FOR GENERATING A BIOMETRIC IDENTIFIER" filed on Mar. 7, 2014; U.S. Patent Application Ser. No. 62/041,803, entitled "SYSTEMS AND METHODS FOR DETERMINING LIVENESS" filed Aug. 26, 2014; U.S. Patent Application Ser. No. 62/066,957, entitled "SYSTEMS AND METHODS FOR PERFORMING IRIS IDENTIFICATION AND VERIFICATION USING MOBILE DEVICES UTILIZING VISIBLE SPECTRUM LIGHTING" filed on Oct. 22, 2014; U.S. Patent Application titled SYSTEMS AND METHODS FOR PERFORMING FINGERPRINT BASED USER AUTHENTICATION USING IMAGERY CAPTURED USING MOBILE DEVICES, filed on Feb. 6, 2015 and bearing 62/112,961; and U.S. Patent Application titled SYSTEM AND METHODS FOR BIOMETRICS BASED USER IDENTIFICATION, filed herewith on Mar. 6, 2015 and bearing 62/192,246 the contents of each of which is hereby incorporated by reference as if set forth expressly in its respective entirety herein.

Exemplary Configuration of Mobile Device with IR or NIR Imaging Capabilities

Figure 6:
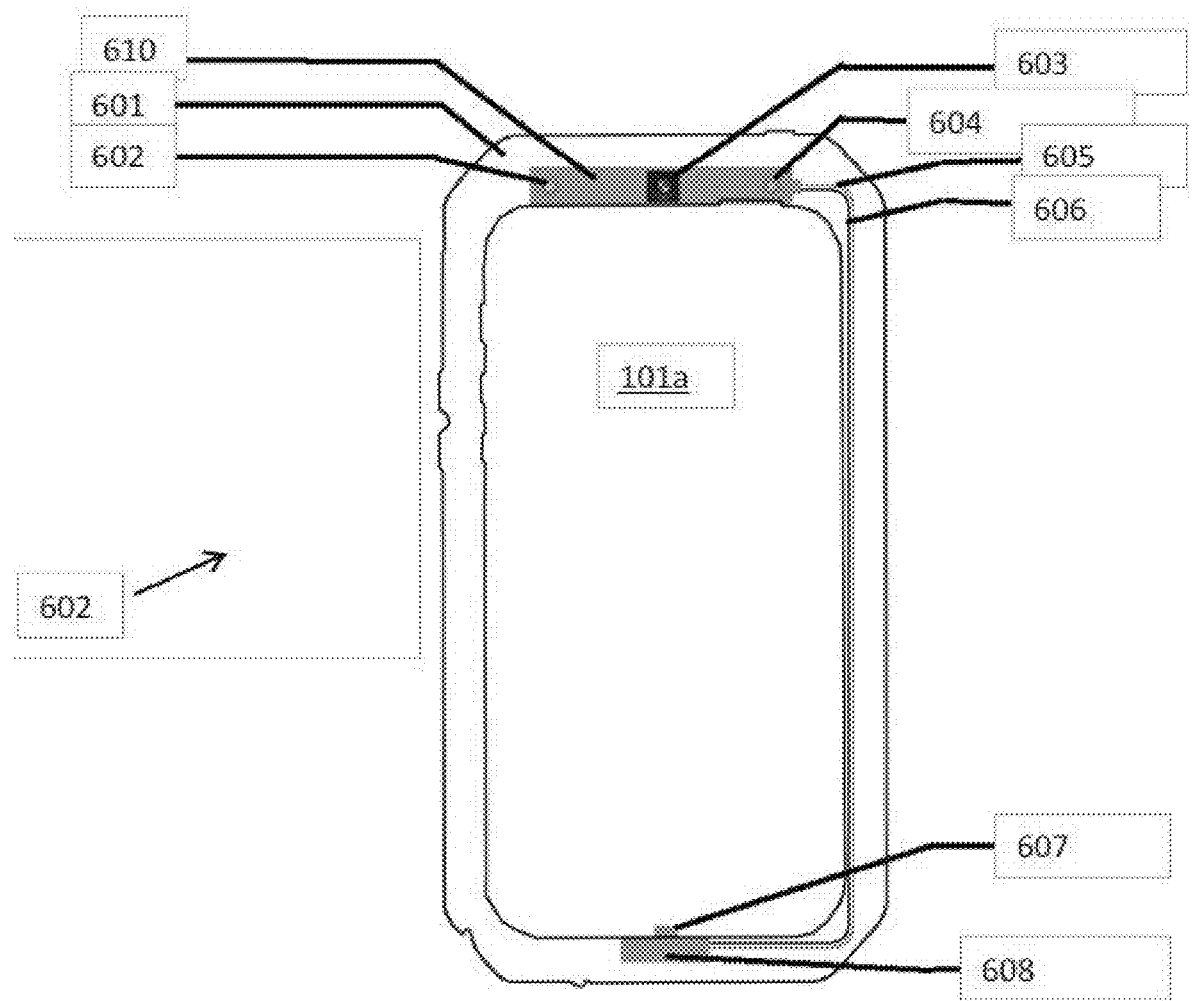
FIG. 6 is a block diagram of a computer system for authenticating a user according to the user's biometric features in accordance with at least one embodiment disclosed herein.

FIG. 6 depicts an exemplary mobile device equipped with multispectral image acquisition devices that can image in the visible, near-IR spectral bands and/or IR bands, or a combination of the foregoing. In one arrangement, the system consists of an assembly 600 enabled for capturing imagery and to be operatively connected to a mobile device (e.g. mobile device 101a). The assembly includes a polycarbonate case 601, a PC board 610. The PC board can be operatively connected to one or more light emitters 602, 604 and at least a sensor (e.g., a camera) 603 capable of capturing digital images. The PC board 610 can also be operatively connected to an electrical connector 607 via one or more data connections and power connections (605, 606). Accordingly, the PC board and its components can be operatively connected to a mobile device 101a via the connector 607, and operatively connected to external computing devices via connector 608. Although the NIR imaging devices are described as external to the computing device, it can be appreciated that one or more elements of the NIR imaging assembly 600 can be on-board to the mobile device 101a.

The sensor can be one or more imaging devices configured to capture images of at least a portion of a user's body including the user's eyes, mouth, and/or face while utilizing the mobile device operatively connected to the case. The sensor can be integrated into the case 601, such as a front-facing camera or rear facing camera, that incorporates the sensor, for example and without limitation a CCD or CMOS sensor. The sensor serves to facilitate the capture of images of the user for the purpose of image analysis by the board 610 and/or the mobile device's processor executing one or more image processing applications for, among other things, identifying biometric features for biometrically authenticating the user from the images. The assembly also includes include one or more light or signal emitters (602, 604) for example, an infra-red light emitter and/or visible light emitter and the like. In some implementations, the camera 603 can include a near-infra-red (NIR) sensor and light emitters (602, 604) can be one or more NIR light emitters, such as, light emitting diodes LEDs, for example, 700-900 nm IR LED emitters.

In accordance with the disclosed embodiments, during the biometric capture step, the processor can cause the NIR LEDs (602, 604) to illuminate the user's eye and a cause the NIR camera 103 to capture a sequence of images. From these images the mobile device processor can perform iris recognition and determine liveness. Accordingly, biometric features can be identified according to positive eye authentication techniques, preferably, by applying algorithms analyzing the iris and/or periocular regions and/or face to infra-red images captured using sensors and IR emitters and/or near-IR emitters which are otherwise not widely integrated in convention smartphones and/or visible light images. However, it can be appreciated that the exemplary techniques for iris imaging and iris recognition can be performed using imaging hardware and software which is on-board the mobile device.

Exemplary Liveness Detection Algorithm Based on Specular Reflections

Figure 7:
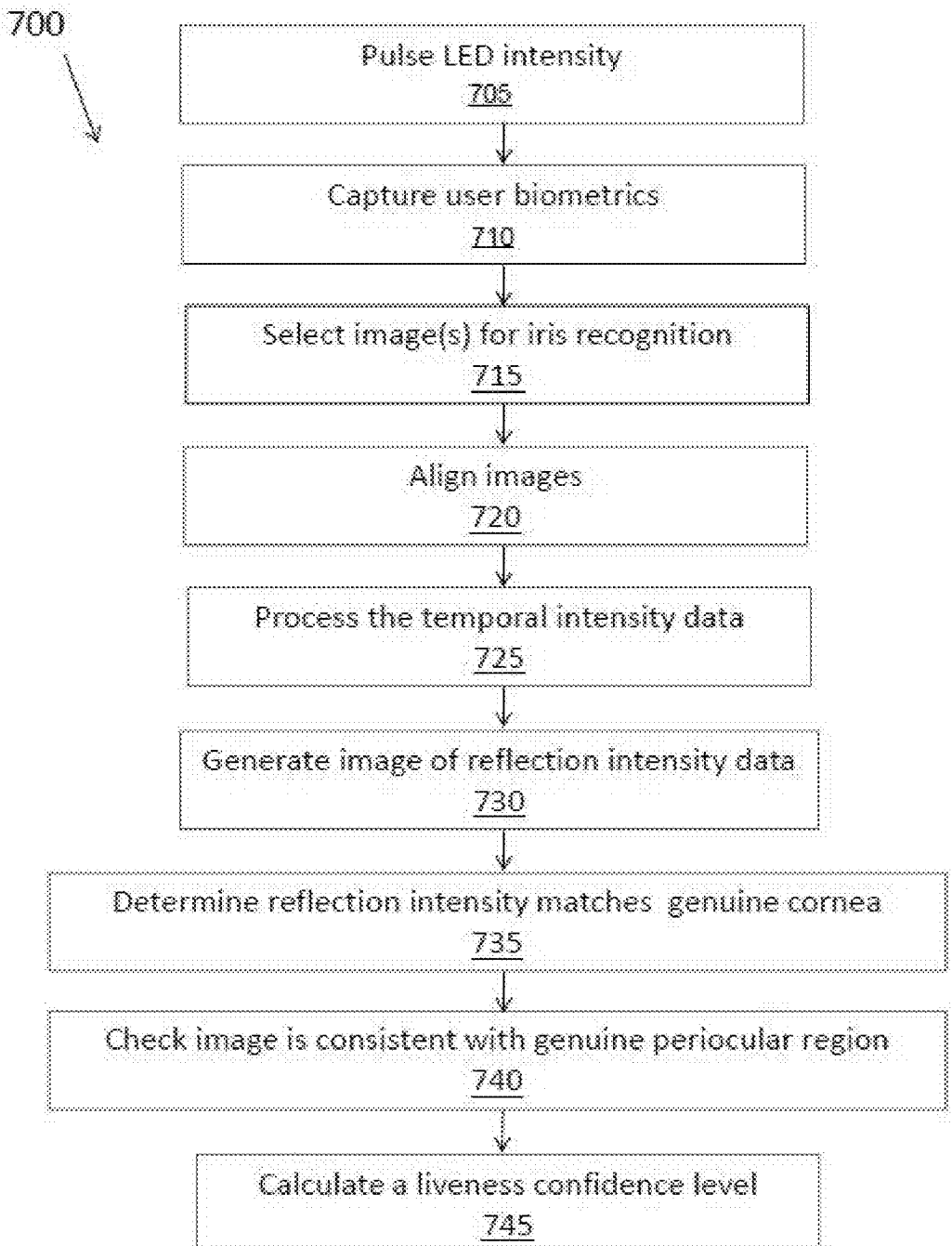
FIG. 7 is a flow diagram showing a routine for authenticating a user according to the user's biometric features in accordance with at least one embodiment disclosed herein.

Turning now to FIG. 7, a flow diagram illustrates a routine 700 for detecting the user's liveness from a series of images captured using, for example, a mobile device 101a having a processor 110 which is operatively connected to the assembly 600 of FIG. 6. In order to more reliably distinguish a user's real eye from an impostor, say, a high resolution print of the user's eye (e.g., 'spoofing') the mobile device processor, using assembly 600, can capture imagery of the user's eyes/face and analyze the images to ensure reflection characteristics particular to a human cornea are present in the captured image.

In some implementations, this can be done by pulsing the intensity of one or more of the LEDs, e.g., 602 or 604 (step 705) and capturing imagery while pulsing the LEDs using the camera 603 (step 710). In the case of a printed cornea reflection the reflection will be continuously present in the images captured, in the case of the genuine cornea, the reflections depicted in the images will pulsate as the LED does. Accordingly, by analyzing the reflections, the mobile device processor can distinguish between reflections of the LED from a genuine cornea and a print that includes an image of a reflection in the cornea.

In an embodiment, one of the LEDs, (e.g., LED 602) remains continuously on and one of the NIR LEDs (e.g., LED 604) is pulsated at 3 Hz with its intensity varying sinusoidally; and the camera 603 has a frame rate of more than 12 frames per second (fps). Preferably, the camera captures multiple image frames for analysis, for example, 30 images. The processor can then analyze the captured images and select, the one or more images having the highest image quality (e.g. bright and unblurred) to be used for iris pattern recognition so as to identify the user (step 715). All of the images, or a subset, can be used to detect the presence of cornea reflections and determine liveness as further described herein.

In order to detect reflections, the processor can align the images so that all images of the iris occur at the same position in each image (step 720). It can be appreciated that the aligned images provide data relating to the intensity of the iris spatially (like a photograph), and temporally (like a video).

Then, at step 725, for each pixel spatially, the processor can process the temporal intensity data to determine the magnitude of the frequency component at 3 Hz, and divide this by the magnitude of the frequency component at 0 Hz. For example, this can be performed by the processor using a Goertzel filter. As a result, the processor can generate an image that shows the strength of the reflection from the pulsating LED compared to the strength of the reflection from the continuous LED (step 730). As can be understood by those in the art, the physical composition of a genuine eye/cornea does not reflect the same amount of light as a non-genuine reproduction nor do they reflect light in exactly the same manner. Accordingly, the processor can then analyze the resulting image to determine if the reflection intensities are indicative of a genuine cornea or a reproduced cornea (step 735). In the case of a printed eye being imaged, the resulting image can have generally constant intensity and of about 50% intensity of a genuine cornea. In the case of a genuine cornea (e.g., captured from a live subject) the resulting image should exhibit a sharp peak of high intensity corresponding to the reflection that is only created by the pulsating LED and not the continuous LED. In addition, the processor can also detect differences in intensity due to shadows created in the periocular region, which give an additional indication that the acquired image has a 3D profile and hence is a live subject.

In addition, at step 740, the processor can analyze the resulting image using an image processing algorithm to check that the resulting image is consistent with that expected from a genuine periocular region. It can be appreciated that the reflection of light from a genuine cornea is a function of the curvature of the eye, which varies from the reflection of a reproduction, say, a flat image of the cornea. As a result the pattern of light reflected (e.g., concentration) varies accordingly. In some implementations, the image can be compared to one or more similarly generated images of genuine periocular regions (e.g., of the user or other users) or compared to prescribed characteristics identified from analyzing imagery of genuine periocular regions. For example, the processor can employ a haar classifier, and/or algorithm for detecting the presence of a strong reflection peak within the region of the pupil, and of an expected size/concentration of the reflection.

Then, at step 745, the processor can calculate a confidence level indicating the likelihood that the images are captured from a genuine periocular region. For example, the confidence level can be a function of how closely the resulting image matches the one or more previously generated images or prescribed characteristics (e.g., as determined at step 740). In addition, the confidence level can be a function of whether the intensity exhibits more constant intensity characteristic of imaging a non-genuine periocular region or exhibits sharp peaks of high intensity corresponding to the reflection that are characteristic of imaging a genuine periocular region (e.g., as determined at step 735). If the liveness confidence level exceeds a prescribed confidence level threshold, the processor can determine that the user is alive and authenticate the user accordingly.

In other embodiments, the LED's can both be pulsated out of phase with each other. The frequencies of the LED pulsating, and the number of frames captures may be adjusted. Pulsating light allows the system to slow down the framerate of capture to acquire more detailed imagery. For example, pulsating the LEDs out of phase or at different frequencies can enable the system to capture data for determining liveness in varying spectrums. Moreover pulsating LEDs at different frequencies can be used to perform analysis in different ambient light scenarios. For example, outdoors where ambient IR light levels are high and indoors where IR levels are lower. Also bursts of IR light can be emitted and can improve the quality of the data collected as compared to a single stream of light and can prolong LED life. Pulsating frequency can also be varied so as to avoid triggering adverse physical responses from users, for example, epileptic reactions. Moreover, simple image subtraction could be used in place of pulse frequency analysis to reduce the number of frames required.

One or more aspects described in relation to routine 700 can also be applied to liveness detection (and/or iris imaging) using, for example, a mobile device 101a having a processor 110 and a camera 145 having integrated light emitters (e.g., LEDs) and without the reliance on IR or NIR LEDs or collectors and external devices.

Exemplary Iris Processing and Iris Recognition Algorithms

Figure 8A:
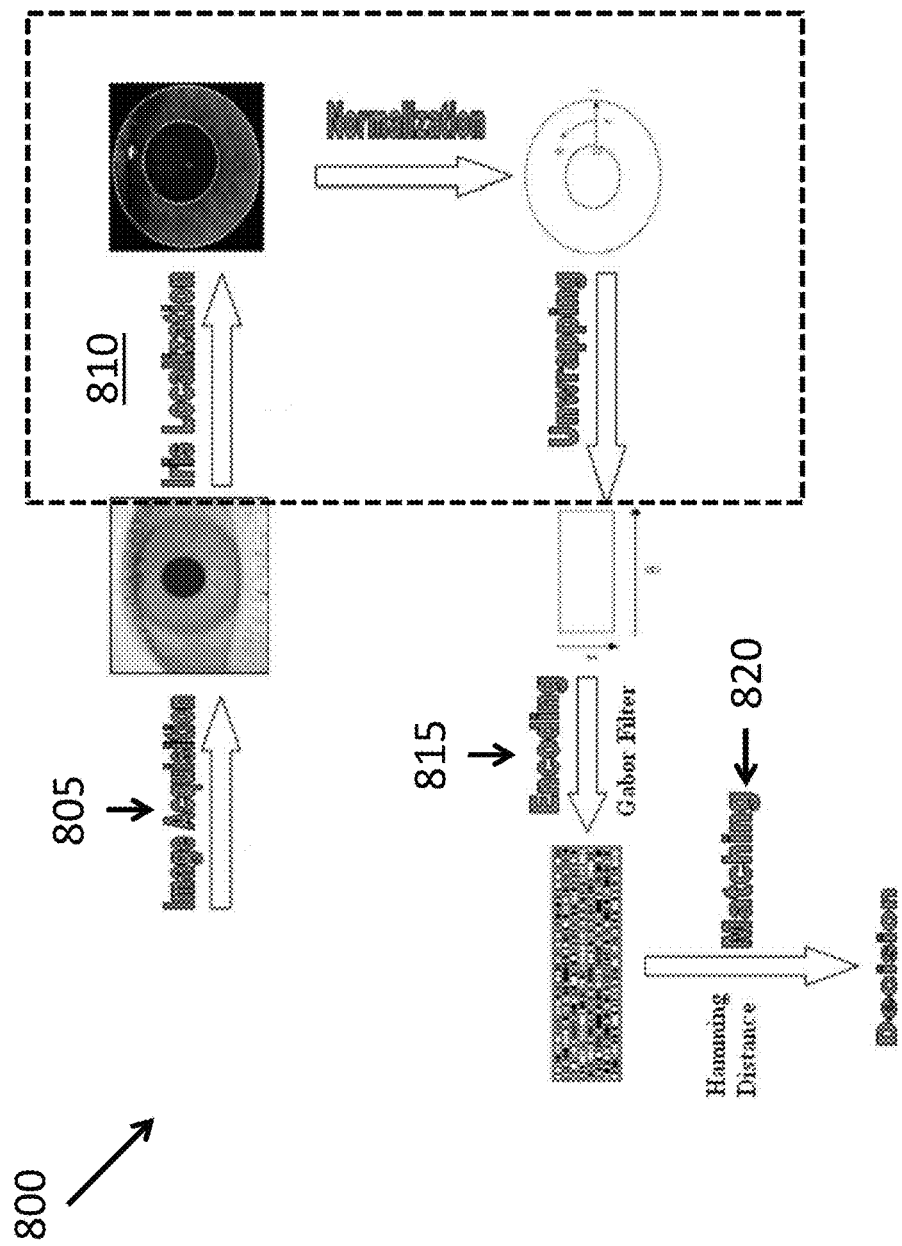
FIG. 8A is a flow diagram showing a routine for authenticating a user according to the user's biometric features in accordance with at least one embodiment disclosed herein.
Figure 9A:
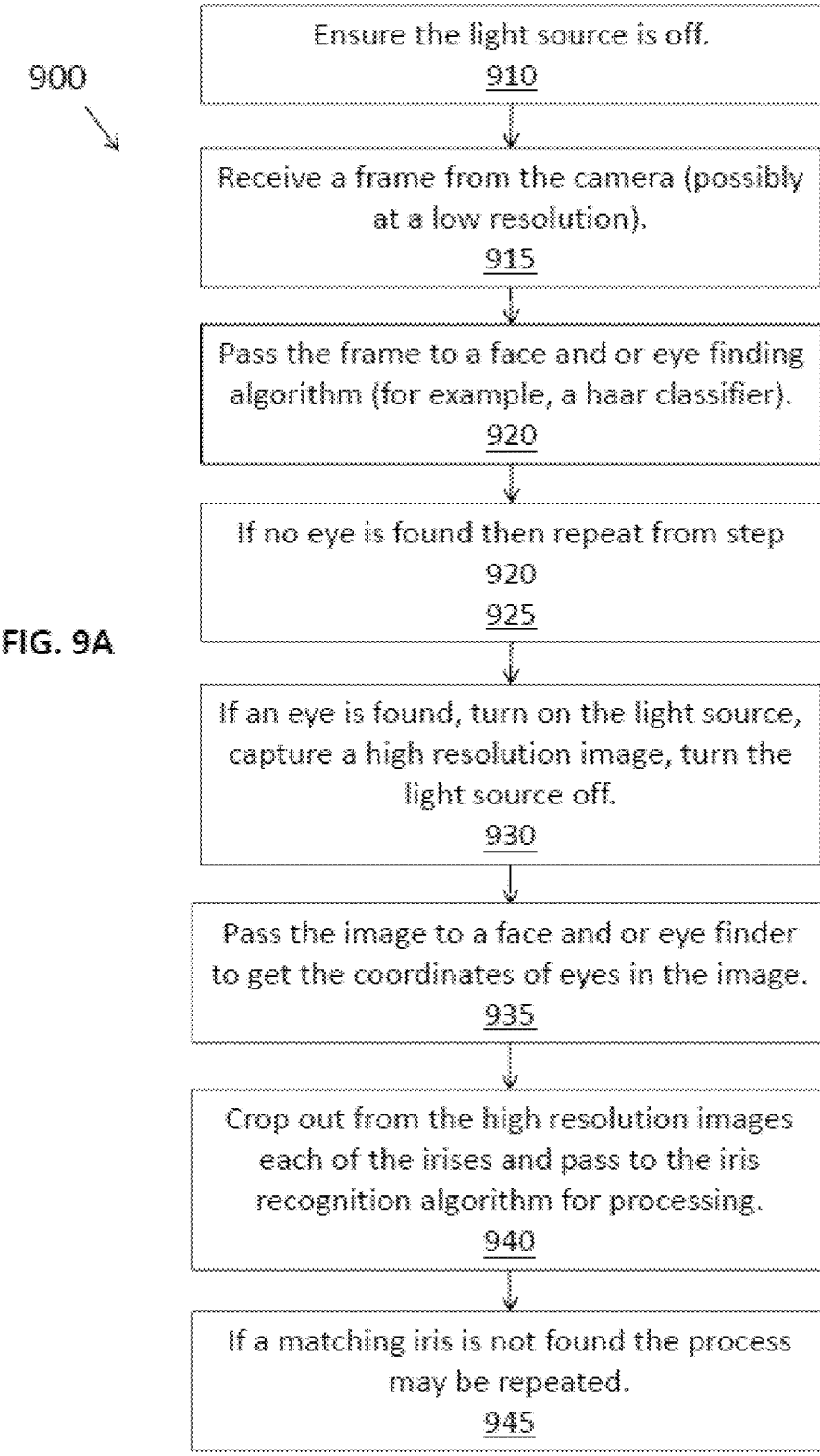
FIG. 9A is a flow diagram showing a routine in accordance with at least one embodiment disclosed herein.
Figure 9B:
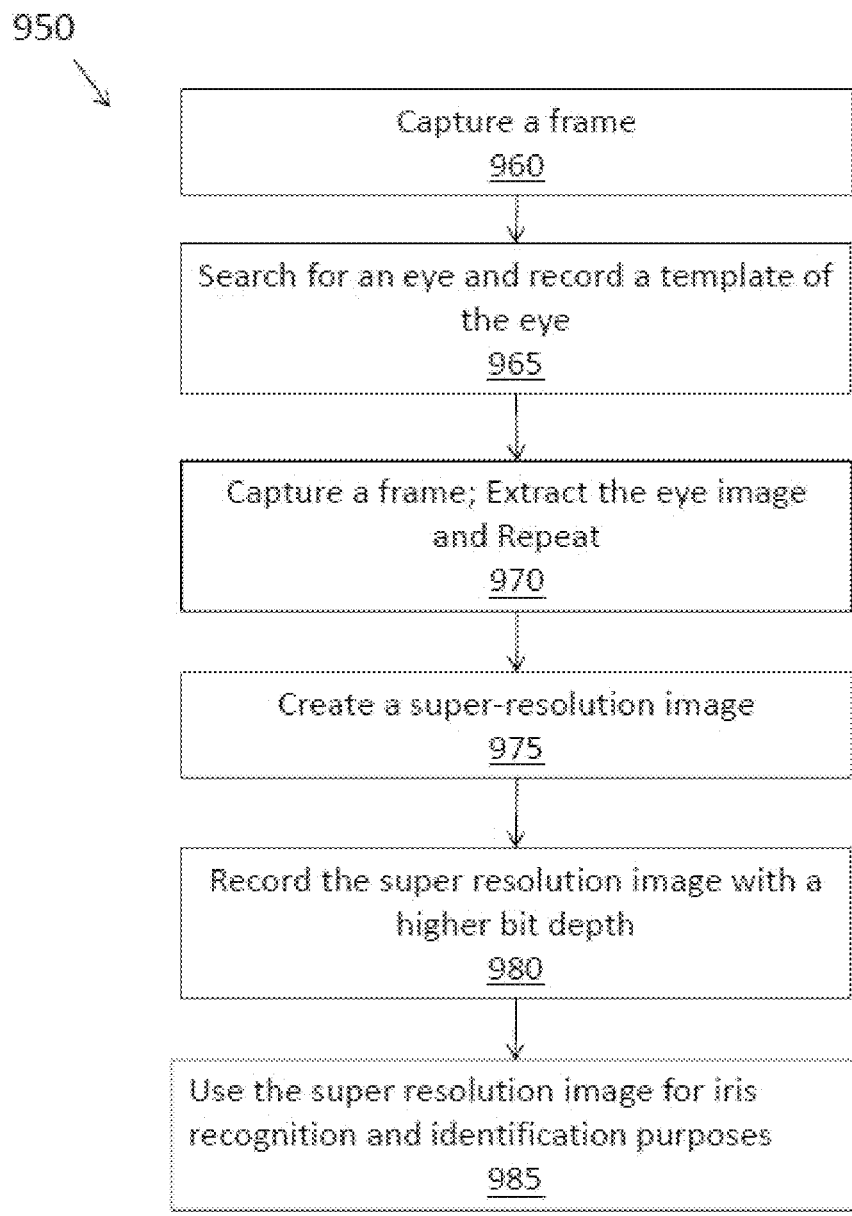
FIG. 9B is a flow diagram showing a routine in accordance with at least one embodiment disclosed herein.

Further described herein are systems and methods for capturing imagery of user biometrics, in particular the iris, and for performing iris recognition (identification/authentication) and determining liveness based on the captured imagery in accordance with one or more disclosed embodiments. FIGS. 9A-9C, as further described herein, illustrate an exemplary routine 900 for iris based user recognition based on imagery of the iris captured in the visible light spectrum in accordance with at least one embodiment disclosed herein. FIGS. 8A-8C, as further described herein, illustrate exemplary processes performed at the various stages of the iris recognition process in accordance with at least one embodiment disclosed herein. U.S. Patent Application Ser. No. 62/066,957, entitled "SYSTEMS AND METHODS FOR PERFORMING IRIS IDENTIFICATION AND VERIFICATION USING MOBILE DEVICES UTILIZING VISIBLE SPECTRUM LIGHTING" filed on Oct. 22, 2014

Conventional iris scanning requires the user to position their eye in front of a machine with infra-red imaging equipment so that an identification or authorization can be made. One advantage of iris scanning is that the scan is highly unique to an individual. Iris recognition systems typically comprise a near infra-red (NIR) light source, and an NIR imaging system. The device captures an image of the iris and uses it for identification or authentication purposes. Iris recognition can provide a high level of security verification (amongst other advantages), and as such there is a demand to use the technique more widely. However, reliance on specialized hardware is a drawback for previous iris-based identification methods.

One or more embodiments of the present invention enable the more wide spread use of iris recognition by performing iris recognition using hardware that is present on in a smartphone, with no or minimal modifications to this hardware and without reliance on IR or NIR light emitters and IR or NIR imaging systems. Because visible light is used to scan (e.g., image) the iris, scanning may be performed on almost any modern smartphone without the addition of any extra hardware. In addition such a system is beneficial in that it provides generally smaller, lighter and lower cost systems/methods for iris scanning/identification than previous iris scanning technologies. Embodiments of this concept are described in more detail herein. It can also be appreciated that various systems and methods described above can be implemented in addition or alternatively to the following exemplary embodiments.

Figure 3:
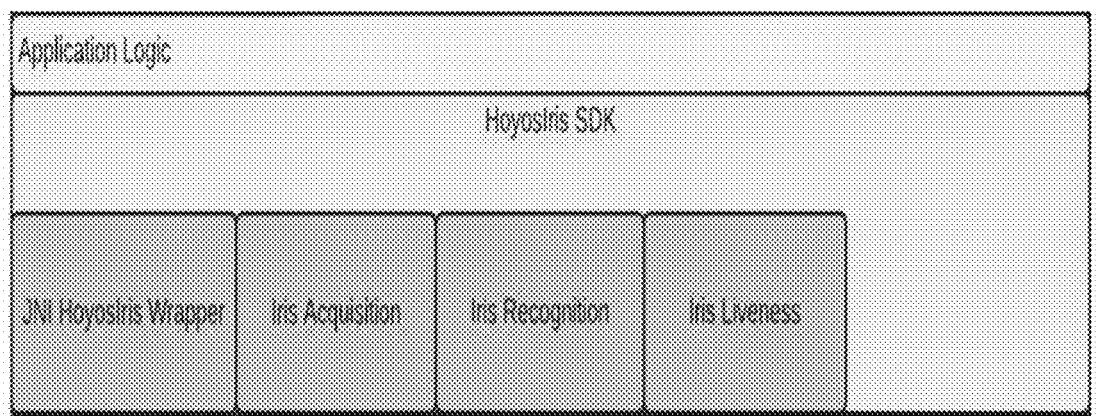
FIG. 3 is a block diagram of software modules for performing iris recognition in accordance with at least one embodiment disclosed herein.

The exemplary processes for iris recognition can be implemented by the processor 110 of the mobile device 101a executing a client application comprising one or more software modules (e.g., software modules 130). As shown in FIG. 3, the software modules for iris based user identification/authentication can include an iris acquisition module, an iris recognition module and an iris liveness module. The iris acquisition module configures the processor to, inter alia, acquire of the biometric features of the user's iris from imagery captured by the mobile device camera 145 or one or more associated imaging devices. The iris recognition module configures the processor to, inter alia, compare user biometrics to previously stored user biometrics for the purposes of user authentication. The iris liveness module configures the processor to, inter alia, determine whether the imagery captured is representative of a live subject.

According to one or more of the exemplary embodiments, a visible light image of the iris can be taken using the camera 145 of a smartphone 101a. This image can then passed to the iris recognition algorithm executing in the processor which compares the iris image to one or more previously stored iris images to determine if the iris matches or not. The result can be used for authentication or identification purposes. Iris recognition system may be considered as consisting of five main stages: acquisition, segmentation, normalization, feature extraction and classification or matching. An exemplary process for performing iris recognition is depicted in FIG. 8A and each of the stages are further described herein.

It should be noted that the comparison of a user biometric to an enrolled biometric may take place on a biometric vectors (e.g., biometric identifiers) that contain key information about the characteristics of the iris that are derived from the iris image. In some implementations, a single iris or both irises may be used as part of the recognition process. In some implementations, the smartphone screen may be switched black to prevent unwanted reflections.

In some implementations, the user may be requested to rotate with the phone during the capture, this way the ambient light reflections will move across the cornea whilst the iris features will remain at a fixed position. The processor can be configured to process the images to identify the ambient light reflections that move across the cornea. Accordingly, the iris features may therefore be decoupled from the ambient light reflections improving the reliability and security of the measurement.

According to one or more of the embodiments, a visible light source from the smartphone can be used during the iris image capture. The visible light source can be a point source from the camera flash that is commonly located next to the rear facing camera of the smartphone. The point source illumination can be used by the processor to washout glare from other light sources in the room and to provide a higher quality image. Such light sources associated with a front facing camera could also be used for the same purpose. Moreover, if the light source has a selectable wavelength, the smartphone (e.g., mobile device 101a) can be used to select an appropriate wavelength to pick out details of the iris. In particular, the smartphone can cause the source to emit, for example, a wavelength corresponding to red light. In addition or alternatively, the smartphone can be configured to cause the display of the smartphone to emit light. Accordingly, the processor can cause the display, which is configured to vary the wavelength of light emitted (e.g., emit red light), to illuminate the eye at an appropriate wavelength of light.

According to one or more of the embodiments, the system can include an iris acquisition system configured to take an image captured from a wide angle camera (typical in smartphones) and analyze the image to locate and isolate irises in the image ready for further processing. An advantage of this is that the user can position their iris anywhere within the wide field of view of the camera, and their iris can still be identified and processed. Furthermore this technique could be used to configure the system to identify irises from a person at a distance or irises in a crowd. For example, the exemplary iris acquisition systems and methods can be implemented by the processor 110 of the smartphone 101a, which is configured by executing instructions in the form of one or more of the software modules 130 therein, in conjunction with one or more cameras 145 and associated hardware and software applications relating thereto. The configured processor can coordinate imaging the iris and can be configured analyze the imagery captured by the camera in near-real time (e.g., while the camera captures one or more images or sequences of images/video) to acquire/identify an iris within the imagery prior to further imaging or analysis steps. In addition or alternatively iris acquisition can also be performed at a later time.

In some implementations, to minimize dazzle from the light source during iris alignment, the configured processor may find an iris in the image before triggering the light source, and the duration of the light source may be minimized to the duration of the capture of images for further analysis.

Turning now to FIG. 9A-9C, FIG. 9A depicts a flow diagram illustrating a routine 900 for iris based user recognition based on imagery of the iris captured in the visible light spectrum in accordance with at least one embodiment disclosed herein. The method begins at step 910, wherein the configured processor ensures that the light source is off while causing the camera 145 to capture one or more images by the camera. Then at step 915 the configured processor receives a frame from the camera. The image frame can be possibly captured and/or analyzed by the processor at a low resolution. Then at step 920, the configured processor analyzes the image frame using a face and or eye finding algorithm (for example, a haar classifier) to identify/find the eye within the image frame. Then at step 925, if no eye is found, then the configured processor can repeat from step 915 and, optionally, prompt the user to move to a more optimal position relative to the camera or location, and/or make other changes to the user's environment to improve image capture (e.g., remove glasses that will obscure the measurement). Similarly, the configured processor can adjust settings of the camera for subsequent image captures to compensate for deficiencies in the previous image frames captured. In addition or alternatively, the processor can analyze the image(s) captured to determine whether the imaged eye is positionally stable, for instance by determining that features have not moved between image captures and gauging sharpness of the image.

Then at step 930, if an eye is found (and optionally if it is determined by the processor that the eye is positionally stable) then the configured processor can cause the camera to turn on the light source, and capture one or more high resolution images and subsequently turn the light source off.

Optionally, prior to this imaging step, the configured processor can adjust exposure and focus specifically for an iris in the previously captured image to improve the quality of the iris information in the captured image.

Generally a flash makes the iris image quality better for analysis and detection of iris features. In particular, a flash drowns out reflections from the environment caused by ambient light which can interfere with the ability of the processor to differentiate between iris features and reflections in the imagery. In addition, in a dark environment, capturing imagery with a flash results in brighter imagery and better detail. However, using a flash can be dazzling the user. In some implementations, if the ambient light is appropriate the smartphone light source may not be used.

Typically, when an image is taken using a smartphone camera and a flash, the camera is configured such that, the flash is turned on by the device and then exposure setting of the camera is automatically adjusted based on the lighting characteristics (e.g., as determined from a lux meter) and the image is captured thereafter. As a result, if the flash is on the user is being exposed to more light. Accordingly, the device can be configured to estimate what exposure is required to image an iris without using the flash based on ambient light levels and known flash output levels such that the user is only exposed to short duration of flash while the imagery is being taken. In addition or alternatively, the configured processor can pre-define the exposure settings based on settings that improve quality iris imagery.

Then at step 935 the configured processor can also analyze the one or more images using a face and or eye finder to identify the coordinates of eyes in the image(s). Optionally, this particular step may be done using the images captured at a lower resolution for increased processing speed.

Then at step 940 the configured processor can also crop out from the high resolution images each of the irises and process the imagery using an iris recognition algorithm.

Optionally, at step 945, if a matching iris is not found by the processor, the foregoing process can be repeated.

In regard to processing the imagery to identify iris features, for example at step 940, various iris recognition algorithms and image processing techniques can be implemented by the configured processor to highlight, extract or otherwise identify features of an iris present in the cropped images.

Turning now to FIG. 8A, FIG. 8A illustrates an exemplary method for iris recognition 800 in accordance with at least one embodiment disclosed herein. The exemplary iris recognition process can include five main stages: acquisition, segmentation, normalization, feature extraction and classification or matching.

As described previously and herein, image acquisition (step 805) includes capturing imagery of the face, or portions thereof, using imaging devices configured to capture imagery in the visible light spectrum, NIR or IR spectrums, using for example camera 145 in conjunction with associated hardware for illumination (e.g., LEDs, NIR LEDs, or IR LEDs). Exemplary images during the Iris Acquisition process are depicted in FIGS. 8B and 8C. As described above and further described herein, iris acquisition can include one or more subroutines to enhance the reliability of the iris acquisition process by determining whether the image data is suitable for performing biometric recognition or should be re-captured. For instance image acquisition can include analyzing the eye images to determine if the eyes are facing directly to the camera or are off axis, or whether the eyes are open or closed. In addition the image characteristics can be evaluated such as blurriness from subject motion and image contrast/brightness to determine if the images are suitable for further analysis or should be re-captured.

Figure 12A:
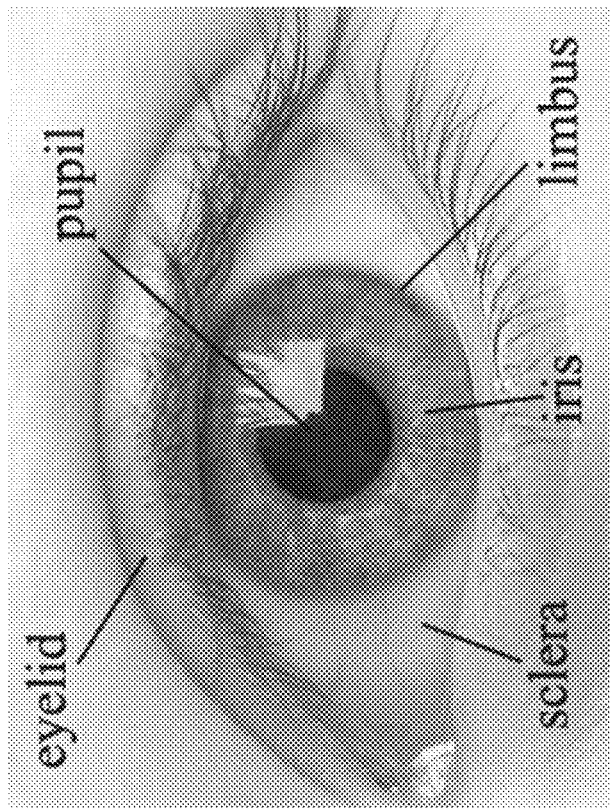
FIG. 12A illustrates an exemplary cropped eye image and various portions of the eye in accordance with at least one embodiment disclosed herein.
Figure 12B:
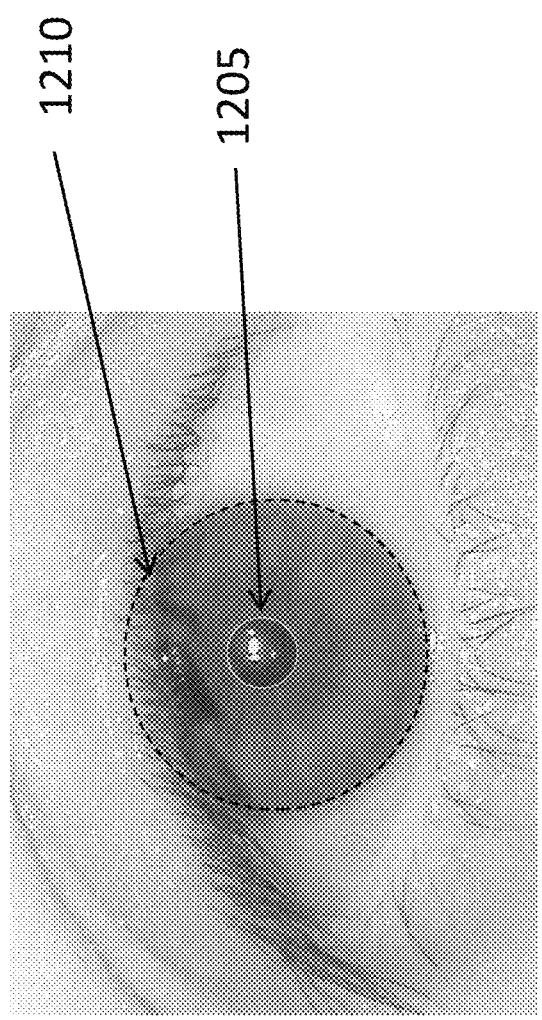
FIG. 12B illustrates an exemplary eye image including boundaries around the pupil and iris identified in accordance with at least one embodiment disclosed herein.

At step 810, Iris segmentation is performed and can include a number of sub-steps including iris and pupil boundary detection, specular detection, eyelash detection and eyelid detection. FIG. 12A depicts an exemplary cropped eye image and identifies various portions of the eye including the eyelid, pupil, iris, limbus and sclera. FIG. 12B depicts an eye image with a single boundary 1205 drawn around the circular pupil and a single boundary 1210 drawn around the circular iris.

NIR images generally reveal more textures than visible iris imagery. Moreover, contrasts between features can be different depending on spectrum, for example, the iris to pupil contrast, and iris to sclera contrast and iris to eyelash contrast can vary between IR, NIR and visible light iris images as shown in FIG. 8C.

For example, processing can include analyzing the cropped imagery to identify the edges of the pupil and accordingly the edge of the iris. In addition, the pattern of the features within the identified region ("the texture") of the pupil can be identified, for example, using a 2D-GABOR filter and a template of the identified texture can be generated and stored for further comparison/matching with one or more previously defined templates.

Various methods can be used to authenticate the user by comparing or matching the iris imagery (or biometric identifiers/templates generated therefrom) to iris imagery captured (or templates generated therefrom) during enrollment of the user. It should be understood that matching can be performed on biometric identifiers (e.g., templates) generated from the iris imagery, in addition or alternatively matching can be performed by comparing the images directly or a combination of the foregoing.

As noted above, in some implementations, near infra-red (NIR) light is used in iris imaging systems because the iris features generally show as bright white when imaged under NIR illumination. Conventional smartphones generally do not include NIR emitters and have visual light emitters. Red light is the closest light in the visible light spectrum to NIR light. As such, in many cases using visible light camera, imaging the iris while illuminated with red light produces higher quality imagery of the iris features than other colors of visible light spectrum. However, in some cases the red channel of light is not always optimal for imaging an Iris, for example, depending on eye color.

In some implementations, the processing of the iris image may be performed only of the red channel of the image where the pattern of the iris may show the most detail. Alternatively the optimum color channel or channels may be selected to maximize use of the detail in the iris. Alternatively, other color channels in the spectrum can also be used. For example, the configured processor can selectively analyze the image information captured in the red and/or green and/or blue channels to identify the iris features in the respective channels. For example, FIG. 12O depicts an original eye image, columns depicting the corresponding color channel specific images (e.g., red green blue images labeled R, G, and B) and the corresponding processed images underneath a respective color channel specific image. With reference to FIG. 12O, optimized processing of the eye image based on wavelength can include splitting the original image into three separate images specific to a respective color channel. Thereafter, for each color channel image, the images can be processed to identify salient biometric features that are more accurately identified in a respective color channel, for example, as previously described and as further described herein. Thereafter, the isolated eye image data can be encoded as individual or combined biometric identifiers. It can be appreciated that these color channels are exemplary and non-limiting and various channels can be analyzed and used to authenticate the user either individually or in combination.

More specifically, the iris segmentation algorithm can include processing the cropped image of the eye to identify the pupil within the cropped image. This can include first finding center of pupil (using moving average and ignore high intensity pix) and searching for the pupil boundary using a circular gradient method which analyzes relative intensity of pixels to identify boundaries between the dark pupil and surrounding iris, which has a different intensity. Upon identifying the pupil, the ensuing step can include identifying the iris. This can include, using the pupil center as the starting point and searching the iris outer boundary using circular gradient method.

Figure 12C:
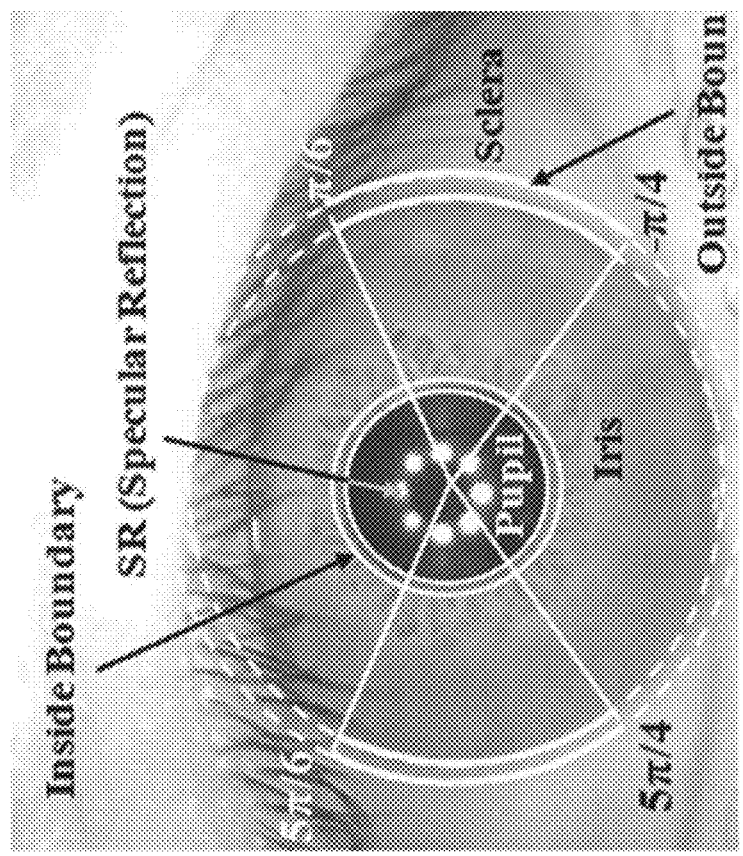
FIG. 12C illustrates an exemplary eye image including boundaries around the pupil and iris identified in accordance with at least one embodiment disclosed herein.

More specifically, in one exemplary boundary detection process, it can be assumed that the pupil and iris are circular features and, the segmentation algorithm executing in the processor can apply a circular gradient algorithm to determine the center of each circle and radius. This can be performed by, for example and without limitation, calculating an averaged intensity gradient for each of a plurality of circles and the circle having the maximum intensity gradient can be identified accordingly. It can be appreciated that, in this manner, inner and outer boundaries of the pupil and/or iris can be identified in view of known characteristics of the pupil and iris boundaries. For identifying the iris boundary, a partial circle can be analyzed using a circular gradient algorithm to avoid interference from the eyelid, which can obscure part of the generally circular iris boundary. As shown in FIG. 12C, the partial circle between pi/6 and −pi/4 and between 5pi/6 to 5pi/4 can be analyzed to identify an inner and/or outer boundary of the iris using a circular gradient algorithm described above. In some implementations, the center and radius of the iris and/or pupil boundaries can be searched based on a pre-determined range of locations and values (e.g., as determined from a training set of eye images or pre-defined characteristics of a set of user eye images or a particular user's eye images).

Figures 12D, 12E:
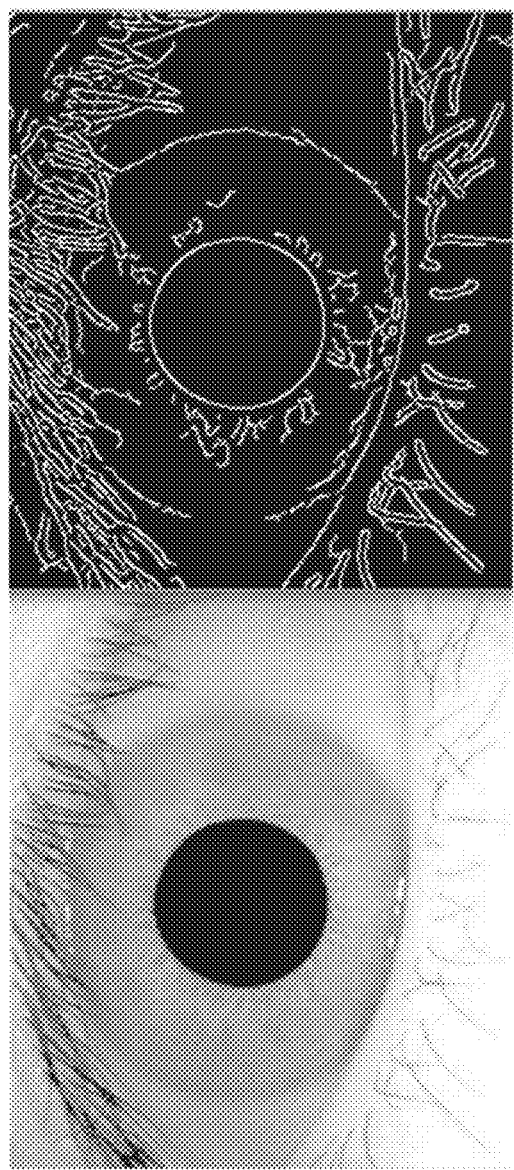
FIG. 12D illustrates an exemplary eye image after processing in accordance with at least one embodiment disclosed herein.
FIG. 12E illustrates an exemplary eye image after processing in accordance with at least one embodiment disclosed herein.

An additional exemplary boundary detection method is shown in FIGS. 12D-12E. In particular, the segmentation algorithm executing in the processor can apply a Canny edge detection algorithm and a Hough circle detection algorithm to identify the pupil and iris boundary. This can be beneficial in that edges of partial circles (e.g., iris boundary) can be detected with greater accuracy. FIG. 12D depicts the eye image after detection of the pupil and iris boundaries. FIG. 12E depicts the eye image after processing using the Hough Circle Detection algorithm and Canny Edge detection algorithm for detecting the edges of the features in the eye image.

Figure 12G:
FIG. 12G illustrates an exemplary eroded eye image in accordance with at least one embodiment disclosed herein.
Figure 12F:
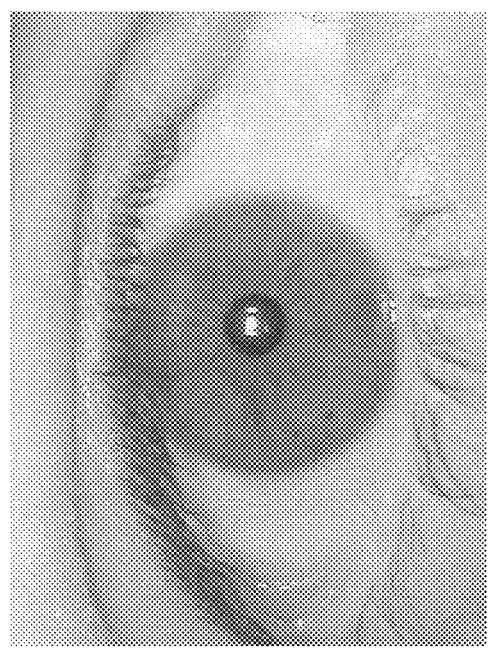
FIG. 12F illustrates an exemplary eye image including a specular reflection in accordance with at least one embodiment disclosed herein.

In addition, segmentation can include detecting and removing specular reflections so that there is minimized interference with gradient detection methods. It can be appreciated that if there is reflection of flash, the reflection can fool the pupil circle detection algorithm. Accordingly, the segmentation module can perform image processing to identify and remove such specular reflections. FIG. 12F depicts the eye image and showing the specular reflection in the pupil as a small bright object. The specular detection algorithm can include detecting the reflection as a small bright object in the eye image and then eroding the image to highlight the specular reflection. An exemplary eroded image is depicted in FIG. 12G.

Figure 12H:
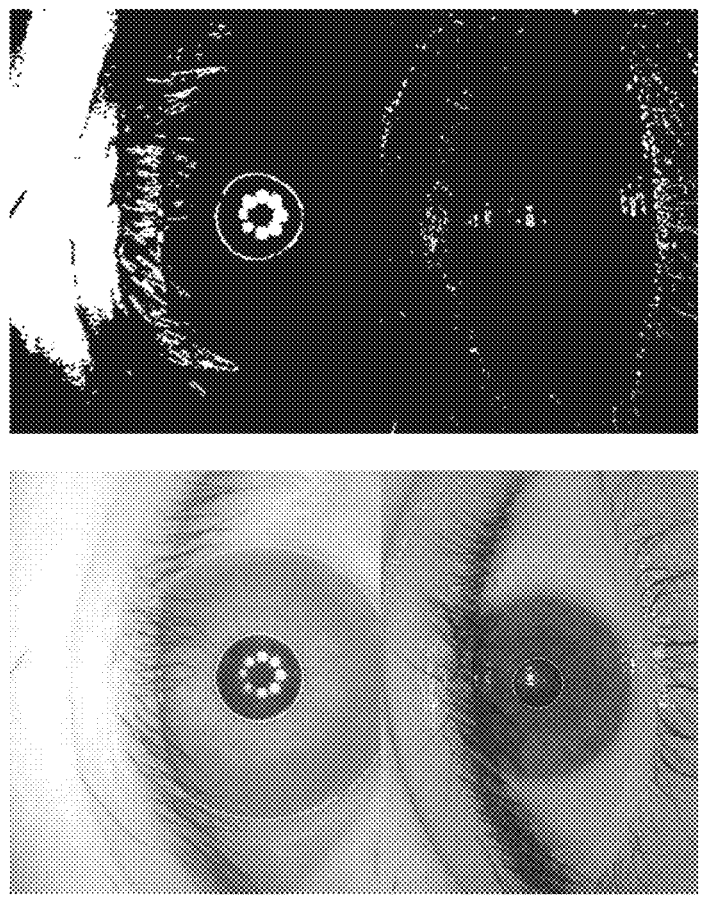
FIG. 12H depicts the eye image captured in both the NIR and visible light spectral bands and corresponding images processed in accordance with at least one embodiment disclosed herein.
Figure 12J:
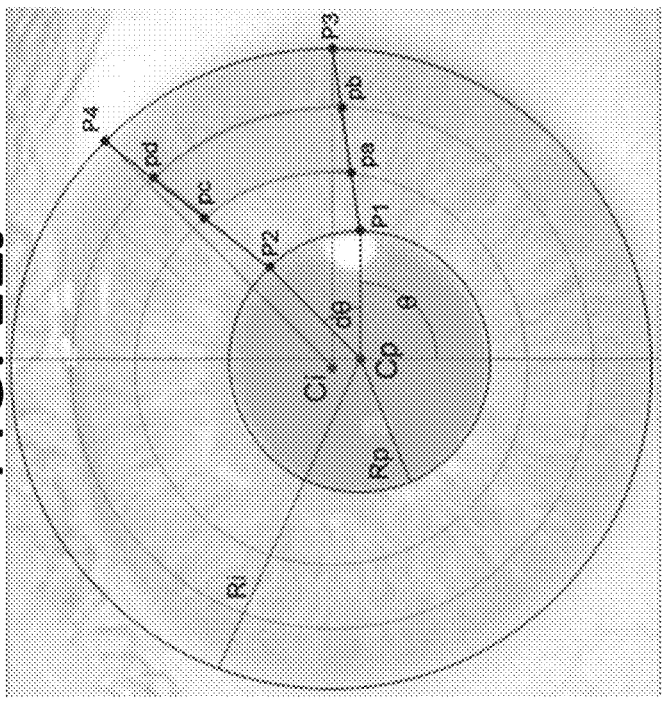
FIG. 12J illustrates an exemplary cropped iris image overlaid with a polar coordinate system in accordance with at least one embodiment disclosed herein.
Figure 12K:
FIG. 12K illustrates an exemplary iris strip in accordance with at least one embodiment disclosed herein.
Figure 12I:
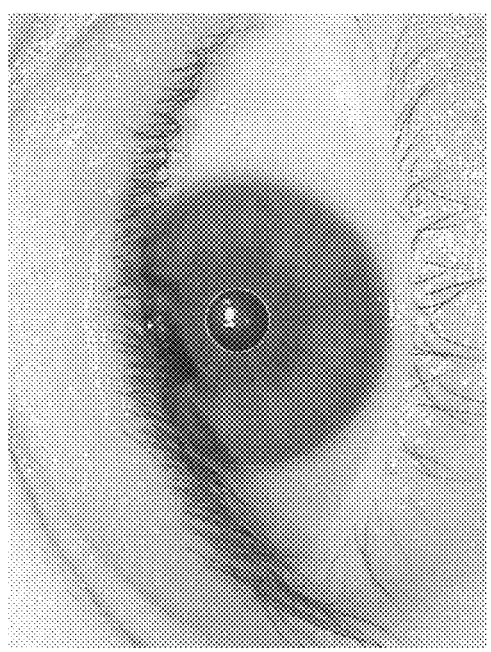
FIG. 12I illustrates an exemplary eye image and determined boundary of the pupil and iris overlaid on the eye image.

During the normalization step, the configured mobile device can re-map the circular iris data to a cartesian iris strip using, for example, a pseudo-polar system. In some implementations normalization includes converting circular iris to rectangular coordinate system, unwrapping and stretching the image data such that the information characterizing the user biometric captured during enrollment and during subsequent matching steps is the same size. FIG. 12I depicts the eye image and shows the determined boundary of the pupil and iris overlaid on the eye image. FIG. 12J depicts the cropped iris image with the polar coordinate system overlaid over the iris image and showing the center of the iris (Ci) and center of the pupil (Cp) and points at various radii around the eye relative to Ci and/or Cp. FIG. 12K depicts an exemplary iris strip including the remapped iris data.

Figure 12L:
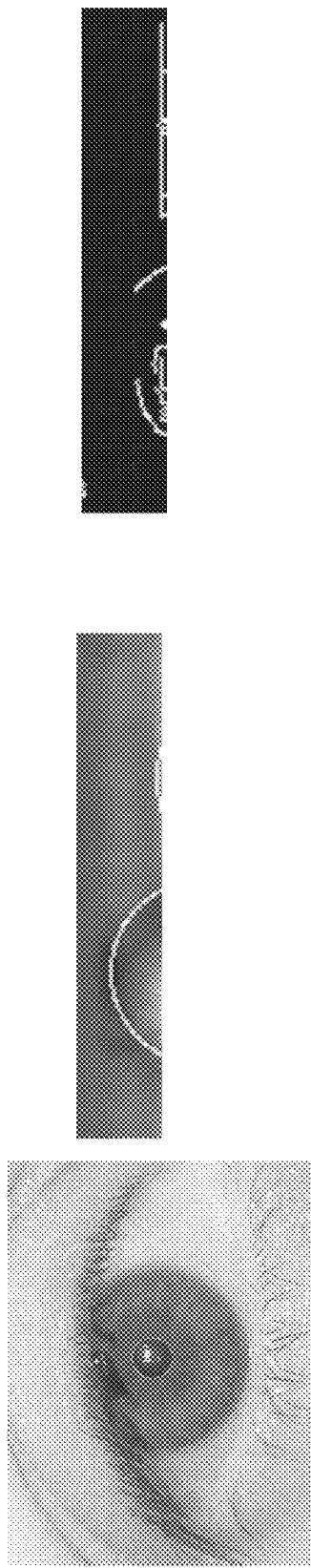
FIG. 12L illustrates an exemplary eye image, an iris strip and the processed iris strip in accordance with at least one embodiment disclosed herein.

The exemplary iris segmentation algorithm can also include the step of identifying the eyelid. In some implementations, this can be performed using anisotropic to smooth iris region but keep strong eyelid edge. For example, with reference to FIG. 12L, which depicts the eye image, the iris strip showing the detected edges and the processed iris strip as further described herein, the eyelid can be searched within the normalized iris strip and eliminating the eye rotation. Thereafter, a circle fitting algorithm can be implemented to identify two partial circles (e.g., left and right) which cover most of the edges represented in the iris strip, for instance, as shown in the fitted eyelid image of FIG. 12L. In addition, identifying eyelid edges can include applying a canny filter to detect eyelid edges, as shown in the detected edges image of FIG. 12L. In addition, identifying eyelid edges can include applying a Hough circle search to find two eyelid circles, as shown in the fitted eyelid image of FIG. 12L. In some implementations, the eyelid identification can be performed on the iris strip to reduce computation time. For example, by modeling the eyelid as a circle on the iris strip and maximizing the area under the circle (votes>0.9*max vote num).

Figure 12M:
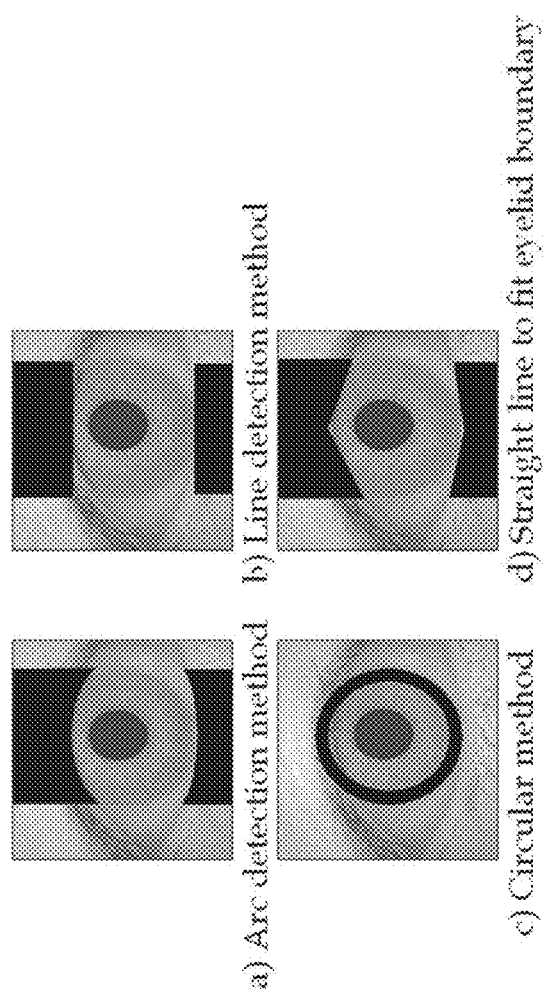
FIG. 12M illustrates an exemplary eye images and eyelid boundaries detected in accordance with at least one embodiment disclosed herein.
Figure 12N:
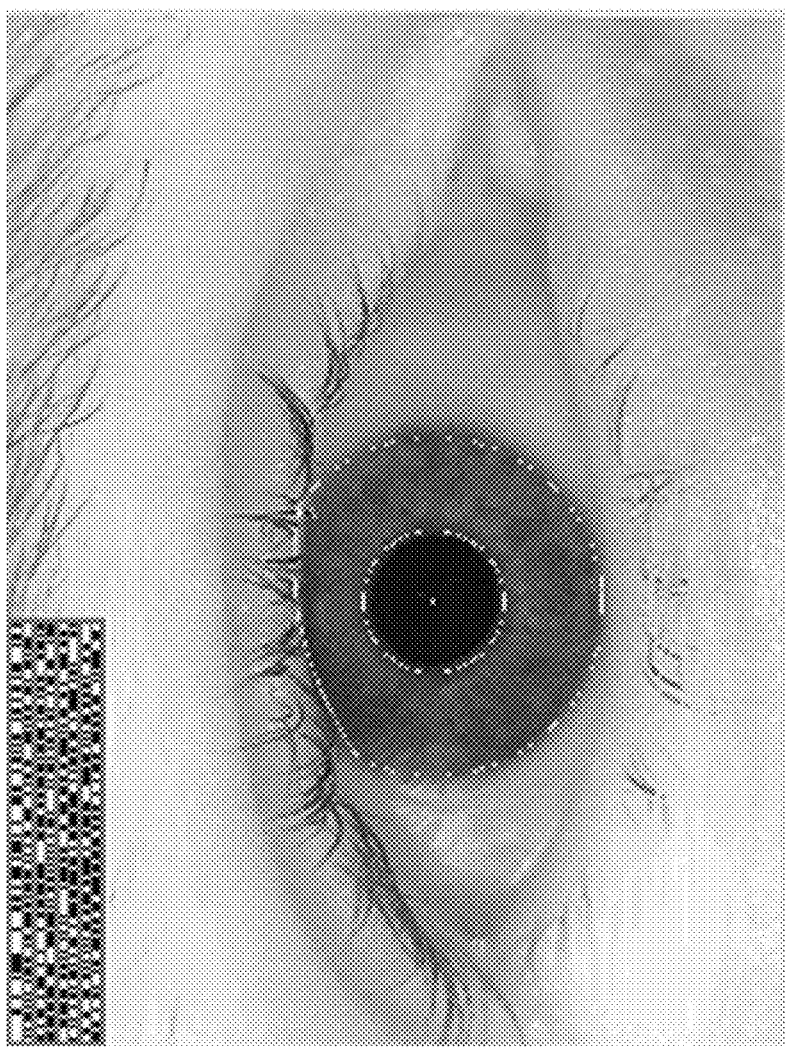
FIG. 12N illustrates an exemplary eye image and showing the detected boundaries of the pupil, iris and the eyelid as well as the encoded iris code in accordance with at least one embodiment disclosed herein.

In addition or alternatively, the eyelid detection process and removal can also be performed on the original cropped image, for example, as shown in FIG. 12M, an arc (or parabola) can be tested against the eye image to detect a match between the arc and the eye image data to identify the eyelid (as shown in sub-image a). Similarly a line, as shown in sub-image b), or multiple lines as shown in sub-image d), can be fit to the eye image data to detect a matching eyelid boundary. In other implementations, a circle fitting method can be used to detect the eyelid boundaries.

The exemplary iris segmentation algorithm can also include the step of finding eyelashes in the original image. Because eye lashes have a high standard deviation and low intensity, this eyelash detection algorithm can include analyzing the eye image with the processor and calculating a local standard deviation combined with intensity information for the pixels to identify the eyelashes. FIG. 12H depicts an exemplary eye image captured in the NIR and visible light spectral bands. FIG. 12H also depicts the corresponding eye image processed according to the calculated intensity and standard deviation.

The exemplary iris segmentation algorithm can also include the step of generating a final mask to mask out image details of features that can skew the biometric characterization of the iris. The mask can be generated based on the identified eyelash and eyelid features, so as to mask the corresponding image data from the iris data used to generate the iris biometric. It should be appreciated that the step of generating and applying the mask can also be performed during the step of encoding the iris data (e.g., step 815 of FIG. 8).

In addition or alternatively, pupil detection can be performed using a "supervised learning" approach (e.g., template matching), in which, the image can be analyzed by looking for an entire section that looks like an eye, as opposed to not just looking for edges. The pupil detection algorithm can include creating a filter based on a training set of eye image. In some implementations, this can include pupil, iris and whites of the eyes. This filter can be tested against the image at every point in the image and a matching response (e.g., closeness of match) can be calculated. In addition, when testing, the filter can be convolved (scaled/adjusted) with the image, and the highest matching response indicates the location of the pupil. In some implementations, the filter could be made scale invariant by testing a few filter sizes.

In addition or alternatively, the location of a pupil (or iris) can be detected by testing known samples of biometric feature textures in different regions of the image to determine where in the image has iris, pupil etc. textures using a classifier. For instance, in some implementations, the configured processor applying the exemplary iris segmentation algorithms can convert images to "Local Binary Pattern space" and can identity the pupil by analyzing the boundary between the untextured pupil and textured iris. Local Binary Pattern space, LBP is a technique for looking at textures in different regions.

It can also be appreciated that the iris segmentation algorithm can include HSV pupil detection methods. Moreover, the iris segmentation algorithm can also include steps for detecting the iris-sclera boundary first (which can be easier for visible light images), so as to provide a more constrained search region for the pupil.

Accordingly, it can be appreciated that using the foregoing exemplary iris segmentation algorithms, one or more of the embodiments disclosed herein can be configured to identify and isolate one or more eyes from even a single image of the user, as opposed to requiring multiple images of a user to extract individual user biometrics from respective images.

In addition, it can be appreciated that imagery captured at the same time by a combination of IR, NIR and/or visible light imaging devices can also be used to segment and encode iris features based on respective strengths and characteristics. More specifically, the data captured by respective images can be analyzed and compared to improve the reliability of feature extraction for iris based identification and determine liveness. Generally, various facial features and eye features exhibit certain characteristics when imaged under NIR illumination and when imaged under visible light illumination and, as such, the image data can be compared in view of such expected characteristics. For example, an iris is generally depicted as bright in an NIR image and relatively darker in a visible light image, whereas an eyelash would not have such a relative brightness in the NIR image. Accordingly, the mobile device can be configured to analyze the images to identify common regions that are brighter in the NIR image and darker in the visible light image and can identify the iris. Similarly, the presence of image features that do not have the expected contrast, for example, eye lashes, can be excluded. It can be appreciated that such image comparisons can also be used to identify interference present in the captured imagery. For example, an NIR reflection would not show up as clear on visible imagery, and thus the relative comparison of images can be used to identify specular reflections.

Returning to FIG. 8A, at step 815, the segmented iris image can be encoded as an "iris code" (also referred to as a vector or biometric identifier) which characterizes the user's iris features. Encoding of a segmented iris image into an iris code is further described herein. In some implementations, the iris code can eb generated using a 2D Gabor filter. In other implementations a 1D Gabor filter or Log Gabor filter can be used. Encoding can also include generating a code mask so as to mask out features that could skew the biometric identifier (e.g., eyelid, eye lashes, specular reflections and the like). In addition or alternatively, encoding of the biometric identifier can also include parameter optimization as a function of orientation and/or light wavelength as further described herein. FIG. 12M depicts the eye image and showing the detected boundaries of the pupil, iris and the eyelid as well as the encoded iris code.

Upon generating a biometric identifier for the user's one or more irises, at step 820, the identifier can be matched to stored identifier so as to biometrically verify the user's identity. It can be appreciated that the steps of routine 800, generally, can be implemented to perform iris recognition using imagery of subject taken under visible lighting as well as NIR and/or IR lighting. Various matching techniques can be implemented depending on the lighting spectrum, as further described herein. In some implementations, iris matching can be performed pixel by pixel and computing a match score. The matching comparison can also include shifting of the iris code (e.g., +/−16 bits) to counter rotational inconstancies. In some implementation if the match score exceeds a particular threshold (e.g., >0.32) then a match can be identified, otherwise a match can be declined (e.g., >=0.32).

Whereas existing techniques for biometrics based authentication generally capture multiple images and extract each biometric (e.g., left iris, right iris) from separate images, according to a salient aspect, the exemplary systems and methods for capturing user biometrics described herein can be configured to capture and extract multiple user biometrics from common image captures. In particular, the mobile device executing the iris processing module can, from a single image of the user's face, identify the face and then identify each eye within the facial image. The system can then extract features of each iris and match those respective iris vectors to authenticate the subject. Using multiple irises that are captured at the same time can be advantageous and improve the security of the iris recognition process. Conversely, existing systems generally capture each eye individually, either by using multiple images from a single camera or multiple images captured using multiple cameras. Moreover, the image captured of the face can also be used to generate a biometric identifier characterizing one or more features of the face, such as the periocular region, for user identification based on this additional feature.

In addition, the exemplary systems and methods described above and herein can include features to improve the image quality of the iris. This can be important, especially for visible light iris recognition as details of the iris may not be as clear as they would be for equivalent infra-red images. For example, visible light iris features may be fainter and thus be more easily obscured by camera noise in comparison to infra-red images. This could lead to a decrease in reliability of the system, especially for people with dark eyes.

In some implementations, the exemplary systems and methods can be configured to implement techniques for enhancing the image quality, including without limitation super resolution, in order to mitigate the problem and increase reliability of visible light iris recognition. Super resolution generally refers to the process of combining data from more than one image into one image of superior quality (for example lower noise, higher resolution, reduced quantisation noise, higher dynamic range, increase focal range). The images may be combined from one or more cameras.

For example, as depicted in the flowchart of FIG. 9B, the following exemplary method 950 may be executed by the configured processor in conjunction with one or more cameras 145 to improve signal to noise ratio and reduce quantisation noise.

960. Capture a frame.

965. Search for an eye using for example a general eye finder such as a Haar-classifier. If an eye is found then record a template of the eye, else go back to step 1.

970. Capture a frame, and find the position of the eye based on the recorded template (commonly known as template matching). Extract the eye image region and record it. Repeat until several eye frames have been found and recorded. Note that as a consequence of this process the eye regions from the different frames can be aligned as they are recorded.

975. Create a super-resolution image in this case with reduced noise. Each pixel in the super resolution image can be created by averaging all the aligned and corresponding pixels from the recorded frames. This has the effect of improving the signal to noise ratio.

980. The super resolution image may be recorded with a higher bit depth than the recorded frames (such as an array of 32 bit floating point pixels intensities rather than an array of 8 bit pixel intensities), thus quantisation noise is reduced and the iris image is more accurately represented.

985. The super resolution image can then be used for iris recognition and identification purposes to achieve a higher reliability and security.

FIG. 9C depicts imagery of a dark eye and iris using various lighting scenarios and depicting the low light image of an iris and a super resolution image combining low light frames in accordance with the disclosed embodiments. The foregoing is an exemplary super resolution technique, and other known super-resolution techniques can be employed, as would be appreciated by those skilled in the art.

According to one or more of the embodiments, a bandpass or long pass filter can be added to the light source of the camera. Accordingly, dazzle can be reduced and more detail may be seen in the iris. For example, if the long pass filter is selected such that only light of wavelength 650 nm or greater passes, then the filter will block all of the blue, green and most of the red light from the iris. What is left are wavelengths of the deepest red detectable by the camera. These deep reds penetrate more deeply into the iris than other visible wavelengths in a similar way to IR light which penetrates more deeply into the iris to give a good image— even of those with dark eyes.

In addition the eye is less sensitive to these wavelengths so the LED flash is less dazzling to the user. However smartphone cameras typically have high sensitivity to this light. Furthermore, the longpass filter has the effect of blocking most ambient light reducing the presence of glare in the iris image. Such filters have low cost (perhaps less than 0.02 USD per square inch) enabling wide distribution.

According to one or more of the embodiments, for example, in the case where the user has light eyes (more than half the European market, and for example 90% the Dutch) a slider is adhered to the smartphone flash enabling a wide band red filter to be positioned over the LED flash for iris capture. This may be achieved by instructing the user to mechanically move the filter into position or automatically with an electro-optic device. This reduces dazzle by allowing only red light which is useful for iris scanning to pass. The slider allows the red filter to be moved to the side when normal photographic illumination is required. Alternatively the slider may be built in to a custom case for the device, such as those available for the Samsung S4. Accordingly, this provides a low cost, and thin, low bulk solution. The filter configuration is not limited to sliding and other mechanical attachment configurations are envisioned.

According to one or more of the embodiments, for example, in the case where the user prefers to use the front facing camera, or brighter illumination is required in the deep red, a deep red (say 650 nm) LED can be added to the smartphone, either integral to the existing device or external to the device, for example as an accessory. This deep red LED can be used to provide the point source illumination required to make high quality iris images, and is at a wavelength that penetrates deeply enough to capture the detail of a dark iris, and is non-dazzling.

According to one or more of the embodiments, a color filter can be added and either permanently or selectively moved into place over the camera. For example, the color filter can be configured to slide over the camera if further ambient light removal is required (this may be required for outdoor use). Optionally this color filter could be incorporated into a magnification lens for long range use. Since such an accessory configuration requires no camera, and no communication with the smartphone, its cost and volume are reduced. However, it can be appreciated that the accessories can be integrated into the smartphone and/or camera.

Similarly an intense NIR light source could be added that is bright enough to penetrate the short pass filter that is intended to block NIR light, such filters are typically present in visible light smartphone cameras. The addition of a long pass filter to block visible light would help to prevent the NIR light from being masked by visible light. Images could be taken with and without the NIR light source on, and the difference between the images used to find NIR iris features.

According to one or more of the embodiments, should the phone have NIR imaging functionality in built (such as is the case for the Amazon Fire phone), NIR iris images may be captured directly.

According to one or more of the embodiments, the smartphone could be fitted with an NIR light source and a camera that has a switchable NIR cut filter that can selectively allow NIR light to pass or block it. This may be achieved by instructing/causing the user to mechanically move the NIR filter into position or automatically with an electro-optic device. This would allow iris recognition to be performed with NIR light (by switching out the NIR filter and optionally adding in a visible cut filter), whilst the camera may still be used for visible light photography (by switching in the NIR cut filter).

According to one or more of the embodiments, iris recognition may be combined with face recognition to provide multiple recognition methods which may increase the reliability/security of the system. Liveness detection for the face may be used during the face recognition step, which naturally increases the security of the iris recognition step. Similarly iris liveness methods may be used during the iris recognition step which may increase the security of the face recognition step.

Further Exemplary Iris Processing and Liveness Detection Algorithms

According to one or more of the embodiments, liveness detection may be added to ensure that the iris being imaged is a real iris rather than a print or a video. Alternatively, liveness detection based on imagery of one or more portions of the eyes can be implemented in the alternative to the iris recognition steps, for example steps 940 and 945 discussed in relation to FIG. 9A and steps 985 discussed in Relation to FIG. 9B. Liveness detection may be performed in ways not limited to:

a). Cornea detection, similar to that described above, for example, in relation to FIG. 7.

b). Depth from motion, depth from stereo cameras, depth from time of flight cameras, depth from focus, similar to the exemplary systems and methods as described above.

c). Detecting defects that can be present in a print or video replica including, contrast ratio, resolution, pixel structure/printer dithering patterns, colour, video scan line artefacts, spectral analysis.

d). Detecting pupil dilation (due to natural variation in pupil size, and in response to changes in lighting such as turning the smartphone flash light on).

e). Other previously discussed methods for facial liveness can be used such as photoplethysmography, gesture detection including gaze detection, brow raise detection, and blink detection and those known in the prior art.

Figure 10A:
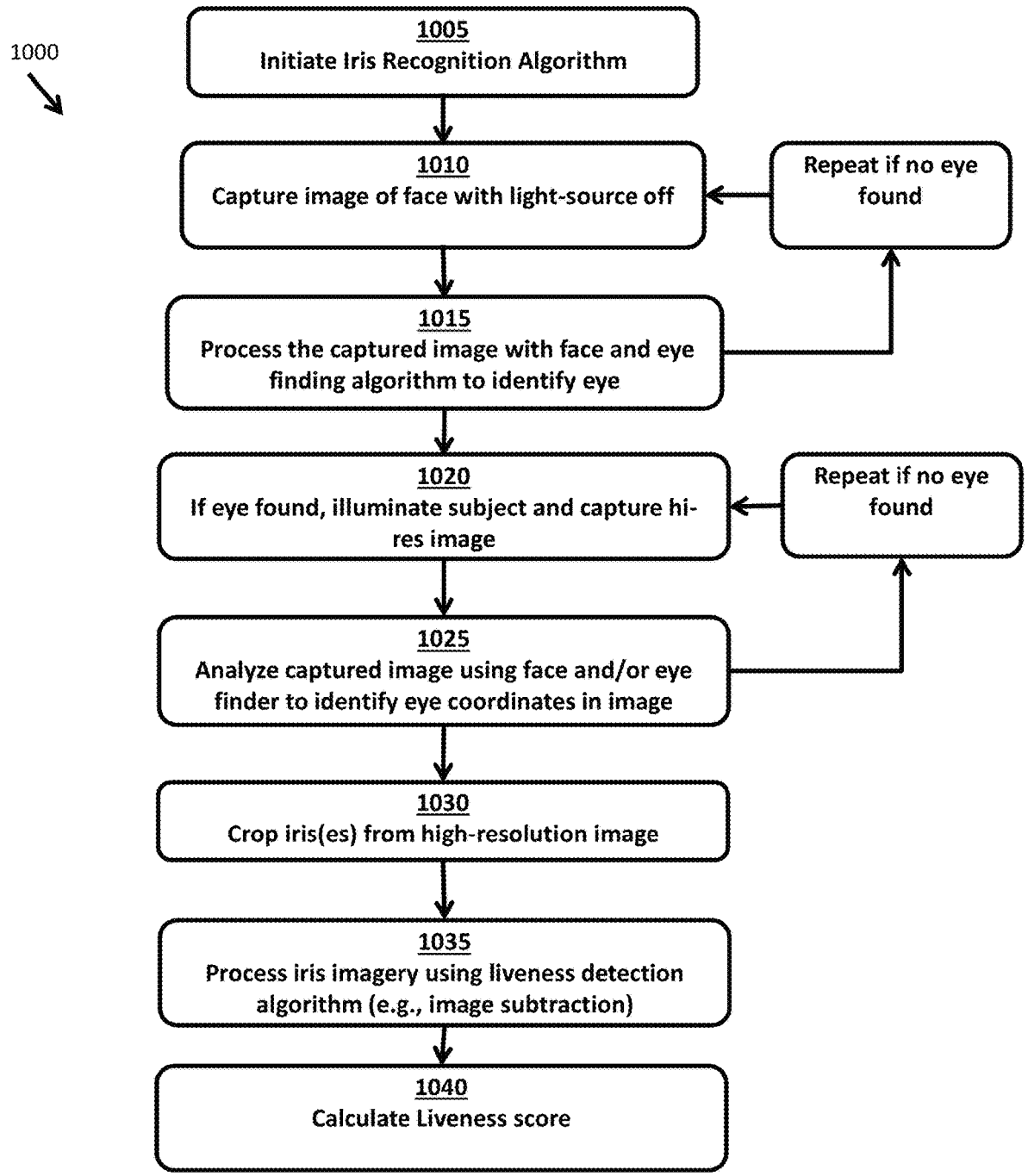
FIG. 10A is a flow diagram showing a routine in accordance with at least one embodiment disclosed herein.

More specifically, in some embodiments liveness can be determined using imagery of the eye(s), including the iris, captured in the visible spectrum using conventional smart phones. FIG. 10A depicts an exemplary method 1000 for visible light and iris based liveness determination. Liveness detection systems/methods can be implemented by the processor 110 of the smartphone 101*a*, which is configured by executing instructions in the form of one or more software modules therein, in conjunction with one or more cameras 145 and associated hardware (e.g., sensors, light emitters, lux meters and the like). The process is initiated at step 1005. In some implementations the image capture and liveness detection process can be initiated automatically by the configured processor or in response to a user interacting with one or more buttons on the smartphone, for example, a volume button input device located on the smartphone.

At step 1010, the configured processor can ensure the light source is off while causing the camera to capture one or more images of at least a portion of the user's face including one or more eyes and the configured processor can receive the one or more image frames from the camera.

Then at step 1015 the configured processor analyzes the one or more images using a face and or eye finding algorithm (for example, a haar classifier) to identify/find the eye within the image frame. If no eye is found then the configured processor can repeat from step 1010), optionally prompting the user to move to a more optimal position, and make other changes to the user's environment to improve image capture (e.g., move camera closer, adjust the camera angle, remove glasses that can obscure the measurement) and re-capture one or more images of the eye with the flash off. Preferably high resolution imagery is captured for the purposes of analysis related to liveness detection, however, it can be appreciated that low resolution imagery can be used to determine adequate imagery/light/positioning before capturing a high resolution image with the flash off.

Then at step 1020, if an eye is found (and optionally if it is determined by the processor that the eye is positionally stable as described above) then the configured processor can cause the light source to illuminate, and the camera to capture one or more high resolution images. (optionally optimizing exposure and focus specifically for imaging an iris in the image), and subsequently turn the light source off.

Then at step 1025, the configured processor can analyze the one or more images using a face and or eye finder to identify the coordinates of eyes in the image(s). This step may be done at a lower resolution for speed. In addition, the configured processor can align the images so that all images of the iris (or other portions of the eye) occur at the same position in each image. Alignment of the images can be performed using a template matching with an image pyramid. Template matching for example is performed by, given a template picture of an eye and an image including an eye that is yet to be identified, exhaustively searching the query image to locate the portion(s) of the query image that is most similar to the template. In view of the possibility that the image is large and matching can be computationally intensive, an image pyramid can be used to speed up the matching process. This can include, downsizing the image to make it smaller and/or less detailed, e.g., low resolution, and analyze the low-res image in view of the template to determine a rough position. Based on the determination, the high resolution image can be analyzed at the determined rough position to locate the eye in the high-res image. Application of such image pyramid and template matching techniques to the steps for pupil finding during the iris detection process also yields beneficial results. In addition, the alignment step can be performed based on the orientation of the mobile device during image capture as determined from an onboard accelerometer or other such orientation measuring device. Accordingly, by using the position/orientation data, the mobile device is configured to perform iris capture and recognition without requiring a specific orientation of the device during image capture, thereby making the user experience more convenient and adaptable to user specific tendencies during image capture.

Then at step 1030, the configured processor can also crop out each of the captured irises from the high resolution images for further analysis. Then at step 1035, the configured processor can process the imagery using a liveness detection algorithm.

In order to more reliably distinguish a user's real eye from an impostor, say, a high resolution print of the user's eye (e.g., 'spoofing') the mobile device processor can analyze the imagery of the user's iris(es) captured with a flash on and flash off to ensure that reflection characteristics particular to a human cornea are present in the captured images and thereby detect liveness. As noted above, the reflection of light from a genuine cornea is a function of the curvature of the eye, which varies from the reflection of an image of a reproduction, say, a flat image of the cornea. As a result the pattern of light reflected (e.g., concentration) varies accordingly. In particular, the curvature of a cornea causes the captured reflection to appear as a focused point whereas a flat reproduction of an iris (or unnaturally curved spoof) would not.

In some implementations, reflection analysis can be done by subtracting the image taken with the light on from the image taken with the flash off. In the case of a spoof attempt using a printed image of a cornea no reflection peak will be present as image subtraction should cancel out corneal reflections present in the spoof image. In the case of the genuine cornea, a reflection peak will be present the image(s) taken with the flash on and absent in the image with the flash off. Accordingly, a reflection peak from a live cornea would be present after subtraction of the images. Subtraction of imagery is one exemplary method of analyzing the reflections to distinguish between a genuine cornea and a print image of a cornea.

Then at step 1040, the processor can calculate a liveness score (e.g., confidence level) indicating the likelihood that the images are captured from a live subject. For example, the confidence level can be a function of the magnitude of the reflection peak. If the liveness score exceeds a prescribed threshold, the processor can determine that the user is alive and authenticate accordingly.

Figures 10B, 10C, 10D:
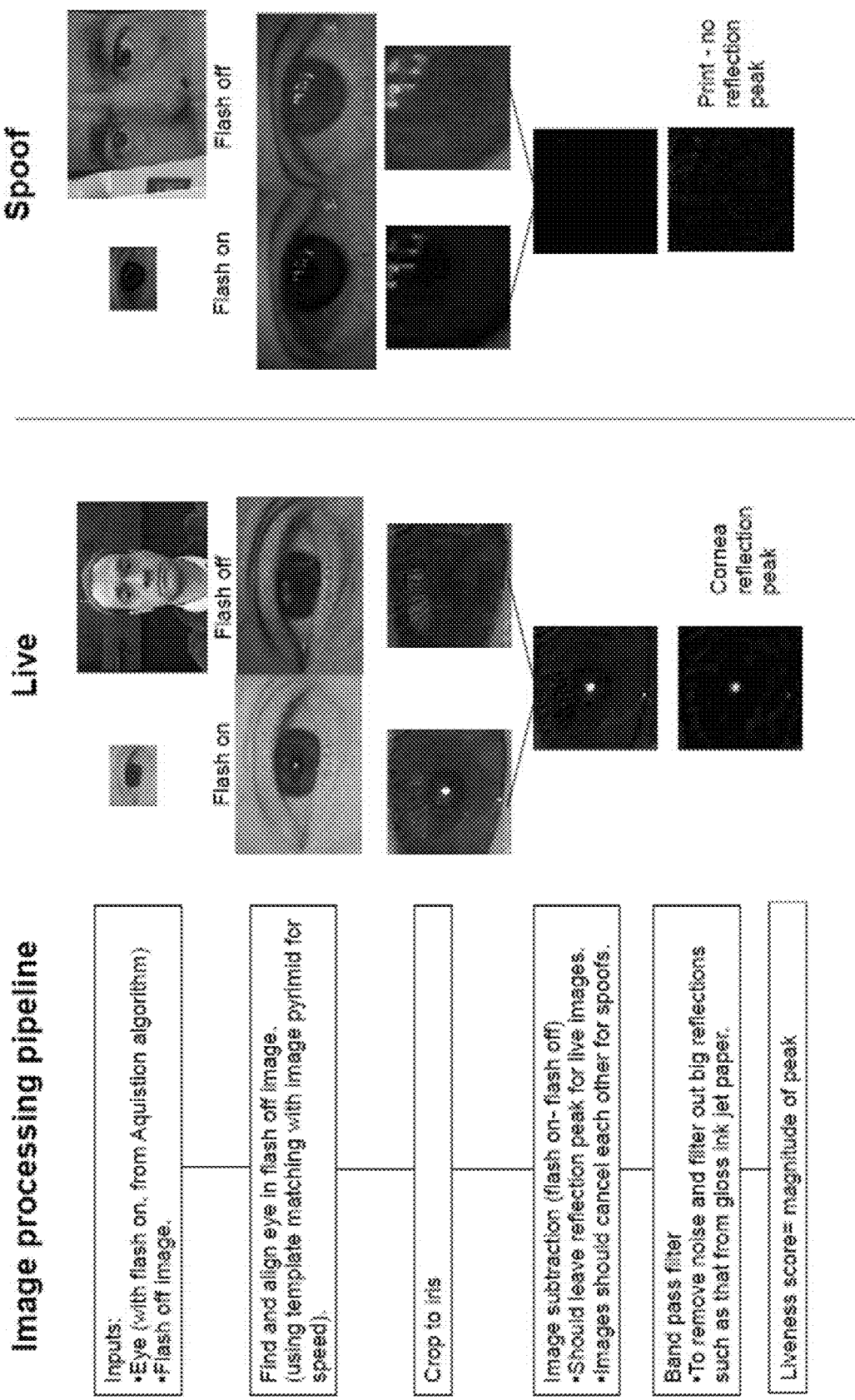
FIG. 10B is a flow diagram showing a routine in accordance with at least one embodiment disclosed herein.
FIG. 10C illustrates imagery of a user's eyes in accordance with at least one embodiment disclosed herein.
FIG. 10D illustrates imagery of a user's eyes in accordance with at least one embodiment disclosed herein.

An exemplary image processing pipeline performed by the mobile device in accordance with the exemplary method 1000 is depicted in FIG. 10B. FIG. 10C depicts imagery of the face, eye and iris of a live user at various stages of the process 1000. FIG. 10D depicts imagery of the face, eye and iris of a spoof image at various stages of the process 1000. It can also be appreciated that, in addition or alternatively to the foregoing method for determining liveness, the exemplary specular reflection analysis described in relation to FIG. 7 can be similarly implemented to determine liveness based on imagery of a user captured in the visible light spectrum.

In a further embodiment, an exemplary liveness detection process can include assessing the depth of one or more portions of the periocular region from focus information associated with imagery captured of the periocular region. Depth of focus is a method of liveness detection that is particularly suited to smartphone technology. The exemplary systems and methods for "depth of focus" liveness determination are configured to capture imagery of one or more portions of the subject's periocular region and analyze the imagery to verify that the three-dimensional (3D) structure of the captured periocular region is consistent with a live person rather than a spoof such as a print or a video reproduction of the subject. For example a printed iris is likely to be flat or curved whereas the corner of a live eye will be considerably recessed compared to the eyebrow. Furthermore the features within the periocular region contain much fine detail that can be captured by the smartphone camera such that identifying and assessing the focus based on the features in accordance with the disclosed embodiments.

Depth of focus liveness detection allows a secure method of liveness detection. Furthermore the exemplary methods for determining liveness based on depth of focus can be implemented using smartphones, in particular in conjunction with the autofocus system of cameras typically found on smartphones and therefore depth of focus liveness can be implemented with nearly any smartphone without requiring additional hardware.

Figure 11:
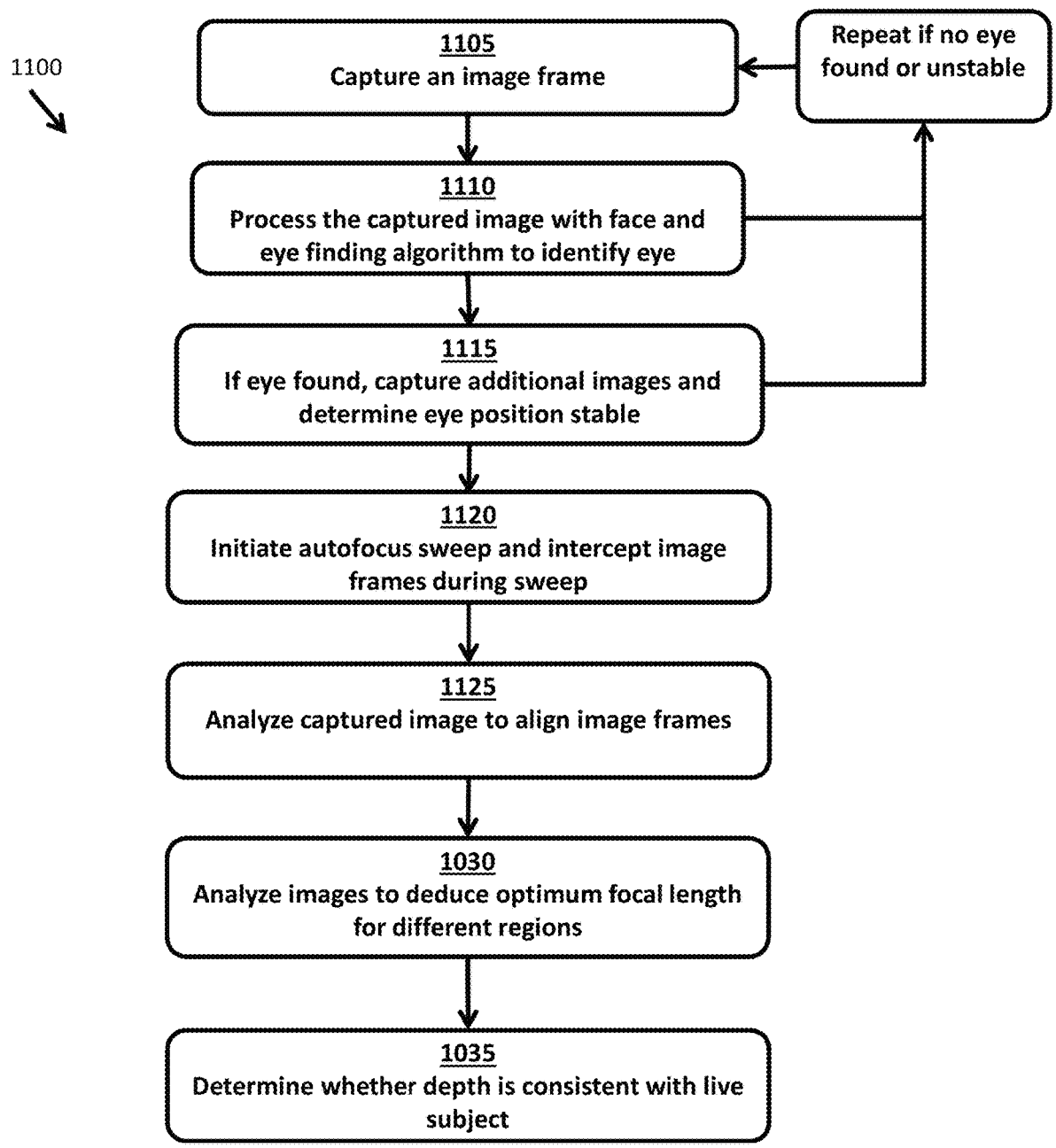
FIG. 11 is a flow diagram showing a routine in accordance with at least one embodiment disclosed herein.

For example, as depicted in the flowchart of FIG. 11, the following exemplary method 1100 may be performed by the smartphone processor, in conjunction with one or more smartphone cameras having a focus system, to detect liveness by assessing the depth of one or more portions of the periocular region from focus information received from the camera and imagery taken using the smartphone. More specifically, the smartphone processor which executes instructions in the form of code therein can be configured to, at step 1105, cause the camera to capture an image frame. At step 1110, the processor processes the image according to an eye finding algorithm to detect an eye and, if no eye is found, repeat step 1105. At step 1115, upon detecting an eye, the configured processor can cause the camera to capture further frames and the configured processor can analyze the imagery to ensure the eye position is sufficiently stable. If the eye position is not stable the process can return to step 1105. Then at 1120, the configured processor can cause the autofocus hardware and software process of the camera to begin. More specifically, the triggering of the autofocus can cause the camera lens to sweep through different focal lengths. During the sweeping, the configured processor can capture and/or intercept the image frames captured by the camera at the different focal lengths. Then at 1125, the configured processor can further process the imagery by aligning the frames. Such alignment can be performed using image stabilization techniques. Then at step 1130, using the aligned image frames, the configured processor can analyze the imagery to deduce the optimum focal length for different regions of the image. Thus, the configured processor can determine the depth for a plurality of regions of the image. For example, this can be done by implementing a focus scoring algorithm such as the Tenenbaum gradient, and determining the peak score as the best focal length. In addition, the position of the peak can be interpolated to give sub-frame accuracy by fitting a curve to the focus sores of each particular and identifying the peak of the curve and a corresponding focal length. Moreover, the configured processor can also be configured to correct for lens aberration so to improve accuracy. Then at step 1135, the configured processor can determine whether the identified depth structure of one or more portions of the periocular region captured in the image are consistent with a live person rather than a spoof. For example, consistency can be determined by the processor by verifying that the corner of the eye is at a different focal plane relative to the eye brows, or by comparing the entire structure of the periocular region to a previously stored model of a periocular region for consistency.

In addition or alternatively, if it is determined that the eye is stable (e.g., at step 1115), the method of detecting liveness based on focal length can include: causing the camera to focus on a particular facial feature, for example, the eyebrow and cause the capture an image. This can be repeated if the analysis of the image by the processor indicates that the user moved too much during the focus process. The configured processor can then cause the camera to focus on another feature, for example, the corner of the eye, and capture an image (and can repeat if the user moved too much during the focus). The configured processor can then determine that the brow and eye corner are in different focal planes by checking that the brow is sharper in the brow focused image capture and that the eye corner is sharper in the eye corner focused image capture. Accordingly, it can be appreciated that the relative sharpness and hence depth for a variety of facial features can be used to determine liveness. By way of further example, depth of facial features can be determined relative to other imaged features (e.g. features in the background of the image), however, security is enhanced by determining the depth of facial features relative to other facial features. The foregoing exemplary methods for liveness determination are particularly advantageous in that depth measurement is highly accurate and ultimately liveness can be determined with a high degree of confidence/security in a short period of time (for example, in around a second or less).

It can be appreciated that use of still imagery and digital camera technology on smartphones is different to the known methods of acquiring 'depth from motion' technique understood by those skilled in the art. In particular, in 'depth from motion,' motion is captured using video and depth determined from the motion captured in the video. Accordingly, it can be appreciated that such 'depth from motion' techniques that rely on video analysis is open to spoof by video. Conversely, the exemplary 'depth from focus' systems and methods described herein check that the 'phase' of the light is correct, and as such cannot be easily spoofed with 2D replications of a subject (e.g., photos or videos) because 2D replications are incapable of replicating the phase of the light correctly. As would be understood by those in the art, a 2-D video/computer monitor is incapable of controlling the phase of light (e.g., when wave starts and stops) and thus cannot project images that appear at diff focal lengths. Although the foregoing describes two exemplary embodiments for depth from focus liveness determination, alternative ways of implementing the depth from focus liveness determination are envisioned without departing from the scope of the disclosed embodiments.

At this juncture, it should be noted that although much of the foregoing description has been directed to systems and methods for authenticating a user according to the user's biometric features, the systems and methods disclosed herein can be similarly deployed and/or implemented in scenarios, situations, and settings far beyond the referenced scenarios.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for authenticating a user according to the user's biometrics. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer implemented method for authenticating a user using a mobile device based on imagery of one or more portions of facial region of the user, wherein the imagery is captured using a camera of the mobile device, the method comprising:

capturing, by a mobile device having a camera, a light emitter, a storage medium, instructions stored on the storage medium, and a processor configured by executing the instructions, a plurality of visible light images depicting at least one facial region of the user, wherein at least a first image is captured by the camera while the light emitter is activated and illuminating the user, and wherein at least a second image is captured while the light emitter is deactivated and is not illuminating the user, wherein the camera is configured to sense visible light, and wherein the light emitter is configured to emit visible light;

detecting, by the processor in at least the first and the second images from among the plurality of images, an eye of the user depicted in the respective images;

aligning, by the processor, at least the first image and the second image;

subtracting, by the processor, at least a portion of the first image from a corresponding portion of the second image;

detecting, by the processor based on a result of the image subtraction, a reflection characteristic of a cornea of the eye by analyzing the result to identify a specular reflection by the cornea and determine the reflection characteristic;

determining, by the processor, that the imagery depicts a live user by comparing the detected reflection characteristic to one or more prescribed reflection characteristics.

2. The method of claim 1, wherein the step of aligning is performed using an algorithm that matches the second image to a template.

3. The method of claim 1, wherein the step of aligning at least the first image and the second image is performed using an algorithm that matches an image pyramid of the second image to a template of the user's eye that was previously recorded on the storage medium.

4. The method of claim 1, wherein the portion of the first image and corresponding portion of the second image each depict at least an iris of the user, and further comprising:
cropping, by the processor, at least the first and second images to isolate the portions of the respective images that depict the iris of the user.

5. The method of claim 1, wherein the step of detecting a reflection characteristic further comprises:
analyzing, by the processor, the result to identify a reflection peak;
calculating, by the processor, a magnitude of the reflection peak; and
wherein liveness is determined as a function of the calculated magnitude of the reflection peak.

6. The method of claim 5, wherein the step of determining liveness further comprises:
calculating, by the processor, a liveness score as a function of the magnitude of the reflection peak;
determining, by the processor, that the calculated liveness score exceeds a prescribed threshold.

7. The method of claim 1, wherein the step of detecting a reflection characteristic further comprises:
measuring the reflection characteristic, wherein the reflection characteristic is one or more of:
a size of the reflection;
a location of the reflection;
a shape of the reflection; and
a magnitude (intensity) of the reflection at one or more portions thereof.

8. The method of claim 7, wherein the step of determining liveness further comprises one or more of:
determining that the size of the reflection matches a prescribed size;
determining that the location of the reflection corresponds to a location of a pupil of the user;
determining that the shape of the reflection corresponds to a prescribed shape; and
determining that the reflection exhibits a reflection peak having at least a prescribed magnitude.

9. The method of claim 1, further comprising:
processing, by the processor, at least the first image and the second image using a filter, wherein the filter comprises a band-pass filter applied by the processor to remove reflections and noise present in respective images.

10. The method of claim 1, wherein the step of detecting the eye in at least the first and the second images comprises:
processing, by the processor, a respective image using a face and or eye finder to identify the location of one or more eyes within the respective image; and
determine, by the processor based on the identified location of the one or more eyes in the at least the first and the second images, that the one or more eyes are positionally stable.

11. The method of claim 1, further comprising: facilitating, by the processor based on the determination that the imagery depicts a live user, the user's access to an access controlled environment.

12. The method of claim 1, wherein the step of aligning at least the first and second image is performed, by the processor, based on the orientation of the mobile device during the capture of the images as determined from an onboard position sensor on the mobile device and in communication with the processor.

* * * * *